(12) United States Patent
Sakai et al.

(10) Patent No.: US 11,216,572 B2
(45) Date of Patent: Jan. 4, 2022

(54) INFORMATION PROCESSING SYSTEM, METHOD FOR PROVIDING SERVICE DATA, AND METHOD FOR BUILDING INFORMATION PROCESSING SYSTEM

(71) Applicant: TOHOKU UNIVERSITY, Sendai (JP)

(72) Inventors: Masao Sakai, Sendai (JP); Eisuke Koizumi, Sendai (JP); Junya Iwazaki, Sendai (JP); Masashi Hisai, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 412 days.

(21) Appl. No.: 16/515,474

(22) Filed: Jul. 18, 2019

(65) Prior Publication Data
US 2020/0233972 A1    Jul. 23, 2020

(30) Foreign Application Priority Data

Jan. 18, 2019   (JP) .............................. JP2019-006705

(51) Int. Cl.
| | |
|---|---|
| H04L 29/06 | (2006.01) |
| G06F 21/62 | (2013.01) |
| G06F 16/22 | (2019.01) |
| G06F 21/64 | (2013.01) |

(52) U.S. Cl.
CPC ...... G06F 21/6218 (2013.01); G06F 16/2255 (2019.01); G06F 21/64 (2013.01)

(58) Field of Classification Search
CPC ... G06F 21/6218; G06F 16/2255; G06F 21/64
See application file for complete search history.

(56) References Cited

U.S. PATENT DOCUMENTS

| | | | | |
|---|---|---|---|---|
| 2005/0283608 | A1* | 12/2005 | Halcrow | G06Q 20/3674 713/175 |
| 2011/0035241 | A1* | 2/2011 | Camenisch | G06Q 20/383 705/74 |
| 2012/0159577 | A1* | 6/2012 | Belinkiy | G06F 21/6218 726/4 |
| 2015/0379510 | A1* | 12/2015 | Smith | G06Q 20/3829 705/71 |
| 2016/0366180 | A1* | 12/2016 | Smith | H04W 12/03 |
| 2018/0287802 | A1* | 10/2018 | Brickell | H04L 9/3263 |

FOREIGN PATENT DOCUMENTS

| | | |
|---|---|---|
| JP | 2005-050330 A | 2/2005 |
| JP | 2012-123651 A | 6/2012 |
| JP | 2016191978 A | 11/2016 |

OTHER PUBLICATIONS

Author unknown, "The Rouge Project", [online], Internet <URL:https://rouge.network/>, printed on Jul. 15, 2019 (14 pages).

* cited by examiner

Primary Examiner — Shin-Hon (Eric) Chen
(74) Attorney, Agent, or Firm — MH2 Technology Law Group, LLP

(57) ABSTRACT

An information processing system 100 includes a client node 1 and an issuing node 2 for issuing a coupon having terms of use Q1. The client node 1 includes a use request unit 155 that requests to use the coupon by presenting user data D held by a user of the client node 1. The issuing node 2 includes: a use request verification unit 253 for verifying whether the information included in the user data D satisfies the terms of use Q1 upon the use request from the use request unit 155; and a use authorization unit 254 that authorizes the client node 1 to use the coupon when the information satisfies the terms of use Q1.

9 Claims, 25 Drawing Sheets

INFORMATION PROCESSING SYSTEM, METHOD FOR PROVIDING SERVICE DATA, AND METHOD FOR BUILDING INFORMATION PROCESSING SYSTEM

CROSS-REFERENCE TO RELATED APPLICATIONS

This application claims priority to Japanese Application No. 2019-006705 filed 18 Jan. 2019, the entire disclosure of which is hereby incorporated by reference in its entirety.

FIELD

The present invention relates to an information processing system, a method for providing service data, and a method for building an information processing system capable of effectively providing service data such as digital coupons.

BACKGROUND

A business model of acquiring new customers by distributing service data such as digital coupons to unspecified people has been widely implemented. Moreover, in recent years, use of blockchain technology in issuing, managing, and trading digital coupons is proposed, the technology capable of preventing recorded data from being falsified while allowing the recorded data to be released to all the people concerned (for example, Non-Patent Document 1).

Related Art Documents, Non-Patent Documents

[Non-Patent Document 1] "THE ROUTE PROJECT", [online], Internet <URL: https://rouge.network/>

SUMMARY

Technical Problem

In order to increase effectiveness in acquiring new customers, it is more desirable to provide digital coupons to limited people who have specific attributes (for example, specific residence, gender, hobby, etc.), who are referred to as "specified people" hereinafter, rather than to merely distribute the digital coupons to many and unspecified people. This makes it possible to issue more strategic coupons that give coupon holders a privilege such as a higher discount rate.

Under current circumstances, in order to issue coupons only to specified people, it is required to secure a urge amount of personal data of candidates who can be the targets for issuing coupons and to select recipients of coupons on the basis of the personal data. However, in most cases, the acquisition and use of such a large amount of personal data takes much cost, and therefore cannot be a practical method.

According to the related art disclosed in Non-Patent Document 1, digital coupons are provided via a specific website to avoid the problem described above. However, even in such a system, it is difficult to limit the recipients of coupons to specified people.

The present invention has been made to solve the above-described problem and addresses the problem of implementing technologies to effectively provide service data such as digital coupons.

Solution to Problem

An information processing system, according to the present invention includes a client node and an issuing node for issuing service data having terms of use, the client node including a use request unit that requests to use the service data by presenting user data held by a user of the client node, wherein the issuing node includes: a use request verification unit for verifying whether the information included in the user data satisfies the terms of use upon the use request from the use request unit; and a use authorization unit that authorizes the client node to use the service data when the information satisfies the terms of use.

A method for providing service data according to the present invention in an information processing system that includes a client node and an issuing node for issuing service data having terms of use, the issuing node providing the service data, wherein the method includes: a use request step, in the client node, for requesting to use the service data by presenting user data held by a user of the client node; a use request verification step, in the issuing node, for verifying whether the information included in the user data satisfies the terms of use upon the use request in the use request step; and a use authorization step, in the issuing node, for authorizing the client node to use the service data when the information satisfies the terms of use.

A method for building an information processing system according to the present invention, the information processing system including a client node and an issuing node for issuing service data having terms of use, wherein the method includes: a step of delivering, to the client node, a program for causing a computer to operate as a use request unit for requesting to use the service data by presenting user data held by a user of the client node; and a step of delivering, to the issuing node, a program for causing a computer to operate as a use request verification unit for verifying whether the information included in the user data satisfies the terms of use upon the use request from the use request unit, and to operate as a use authorization unit for authorizing the client node to use the service data when the information satisfies the terms of use.

Effect of the Invention

According to the present invention, an issuing node issues service data having terms of use; a client node requests to use the service data to the issuing node by presenting user data; and the issuing node authorizes the use of the service data when information included in the user data satisfies the terms of use. This allows a system to provide the service data only to users who can satisfy the terms of use, thereby making it possible to issue more strategic service data. As such, service data can be provided more effectively compared to the prior art.

DESCRIPTION OF EMBODIMENTS

Hereinafter an embodiment according to the present invention is described with reference to the drawings. However, the present invention is not limited to the embodiment described below.

First Embodiment

First, a simplified embodiment is described as a first embodiment.

System Configuration

Figure 1:
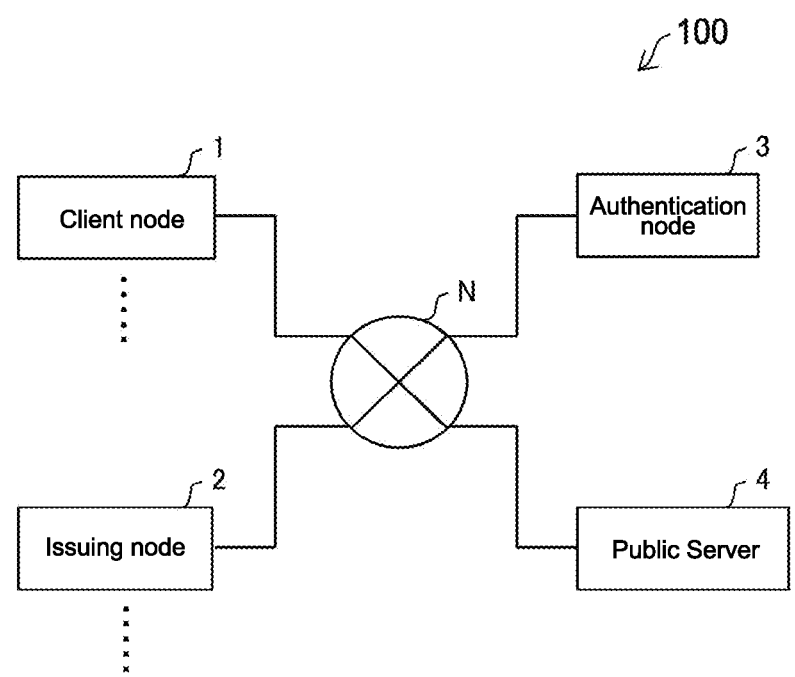
FIG. 1 schematically illustrates an information processing system according to a first embodiment.

FIG. 1 schematically illustrates an information processing system 100 according to a first embodiment. The information processing system 100 includes a client node 1, an issuing node 2, an authentication node 3, and a public server 4. The client node 1, the issuing node 2, the authentication node 3, and the public server 4 are connected to communicate with each other wired or wirelessly via a communication network N such as the internet.

The client node 1 is an information processing device managed by a user who uses digital coupons. A client program P1, which is descried later, is installed in the client node 1. The client node 1 may be constituted by a general-purpose computer such as a desktop PC, a notebook PC, a smartphone, a tablet terminal, PDA or the like.

The issuing node 2 is an information processing device which issues digital coupons having terms of use. An issuing program P2, which is descried later, is installed in the issuing node 2. The issuing node 2 may also be constituted by a general-purpose computer such as a desktop PC, a notebook PC, a smartphone, a tablet terminal, PDA or the like similarly to the client node 1.

The authentication node 3 is an information processing device managed by a service provider that provides a service capable of effectively issuing digital coupons (hereinafter referred to as "coupon providing service"). An authentication program 3, which is described later, is installed in the authentication node 3. The authentication node 3 may be a terminal device that is managed by individuals.

The public server 4 is a server for publicly releasing various types of data such as coupons that were issued. According to this embodiment, the public server 4 is managed by a user of the authentication node 3.

Additionally, the information processing system 100 may include a node other than the client node 1, the issuing node 2, and the authentication node 3 that is, a node wherein none of the client program, the issuing program, and the authentication program are installed.

Configuration of Each Node

Figure 2:
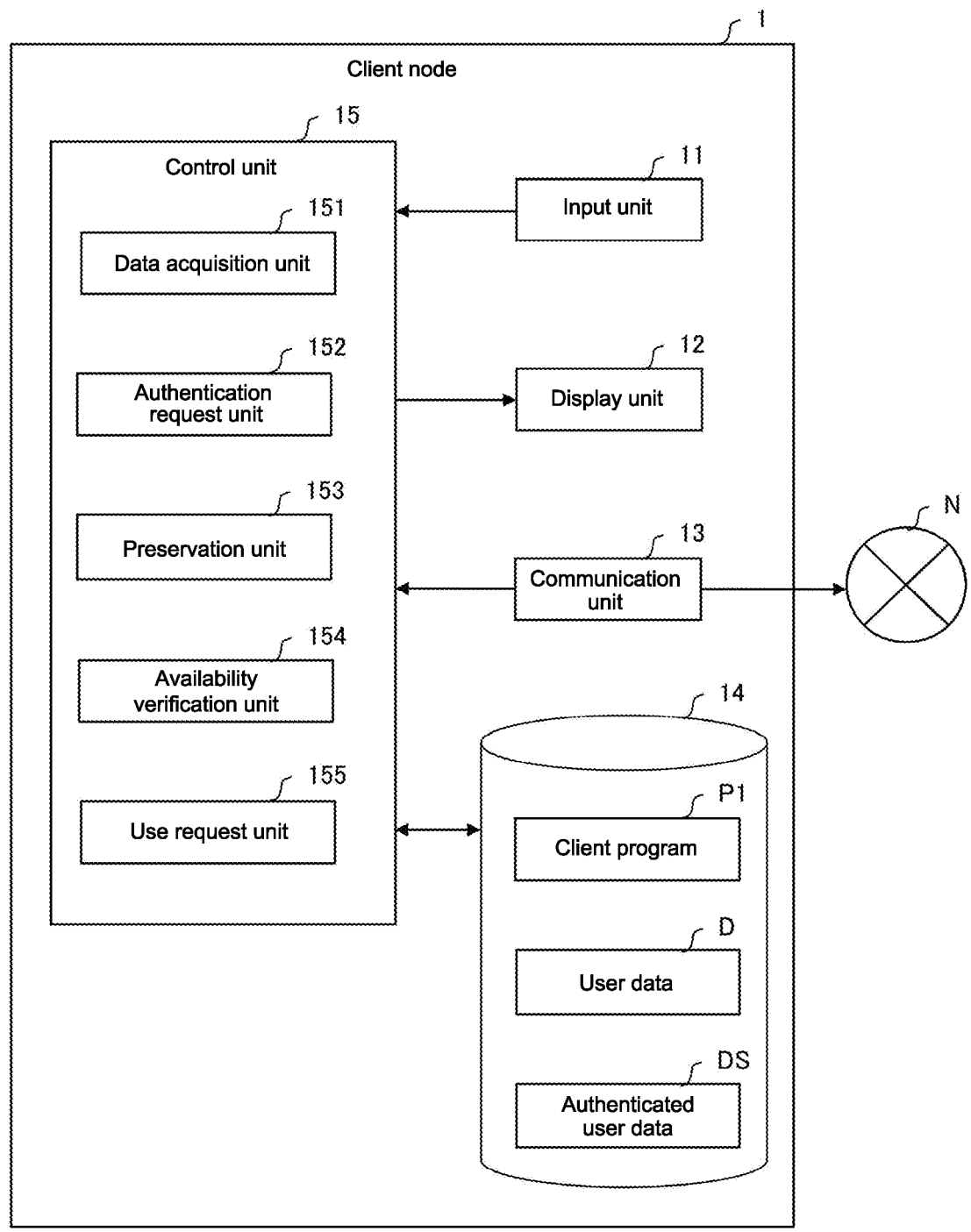
FIG. 2 is a functional block diagram illustrating the configuration of a client node according to the first embodiment.
Figure 3:
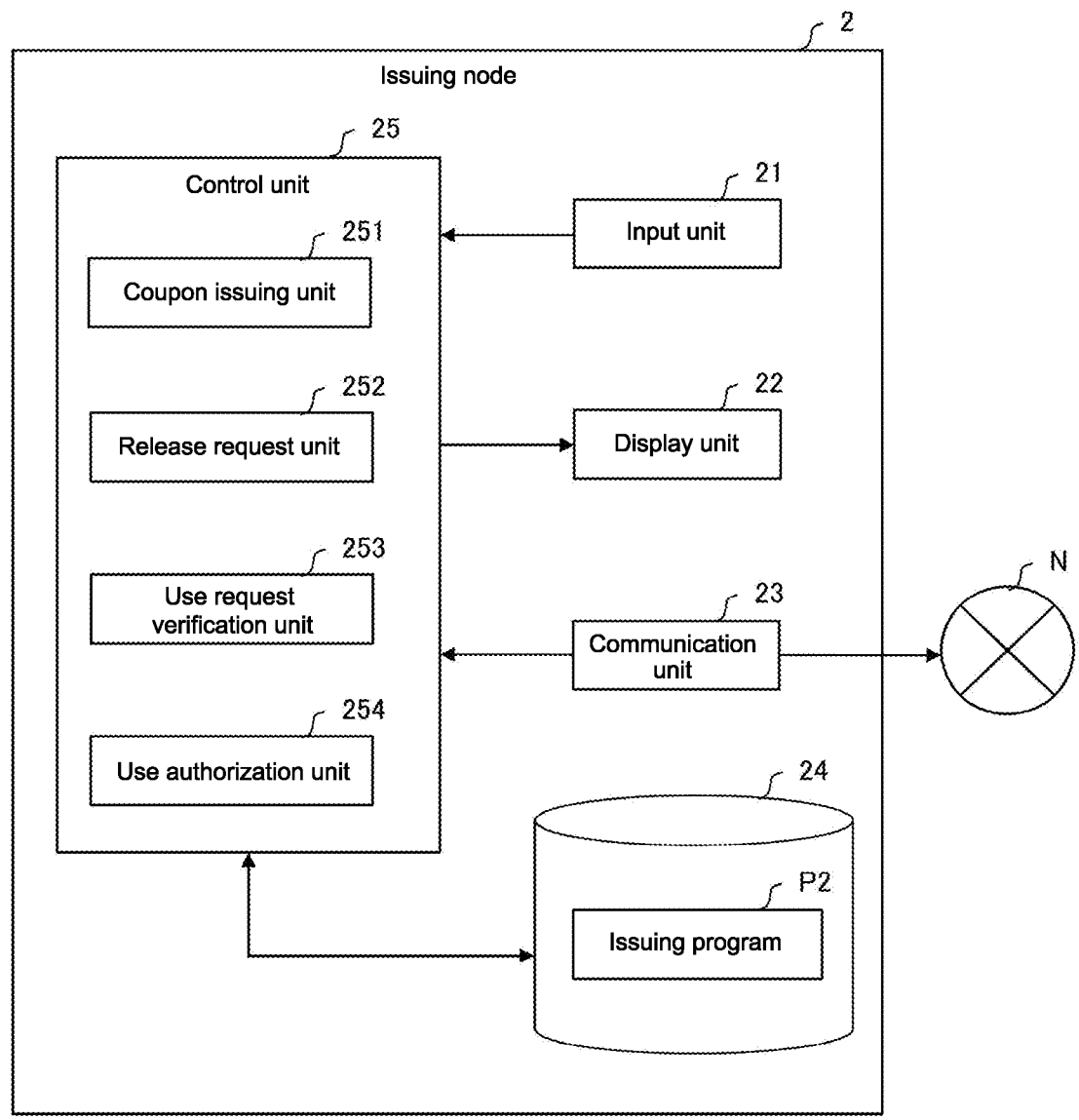
FIG. 3 is a functional block diagram illustrating the configuration of an issuing node according to the first embodiment.
Figure 4:
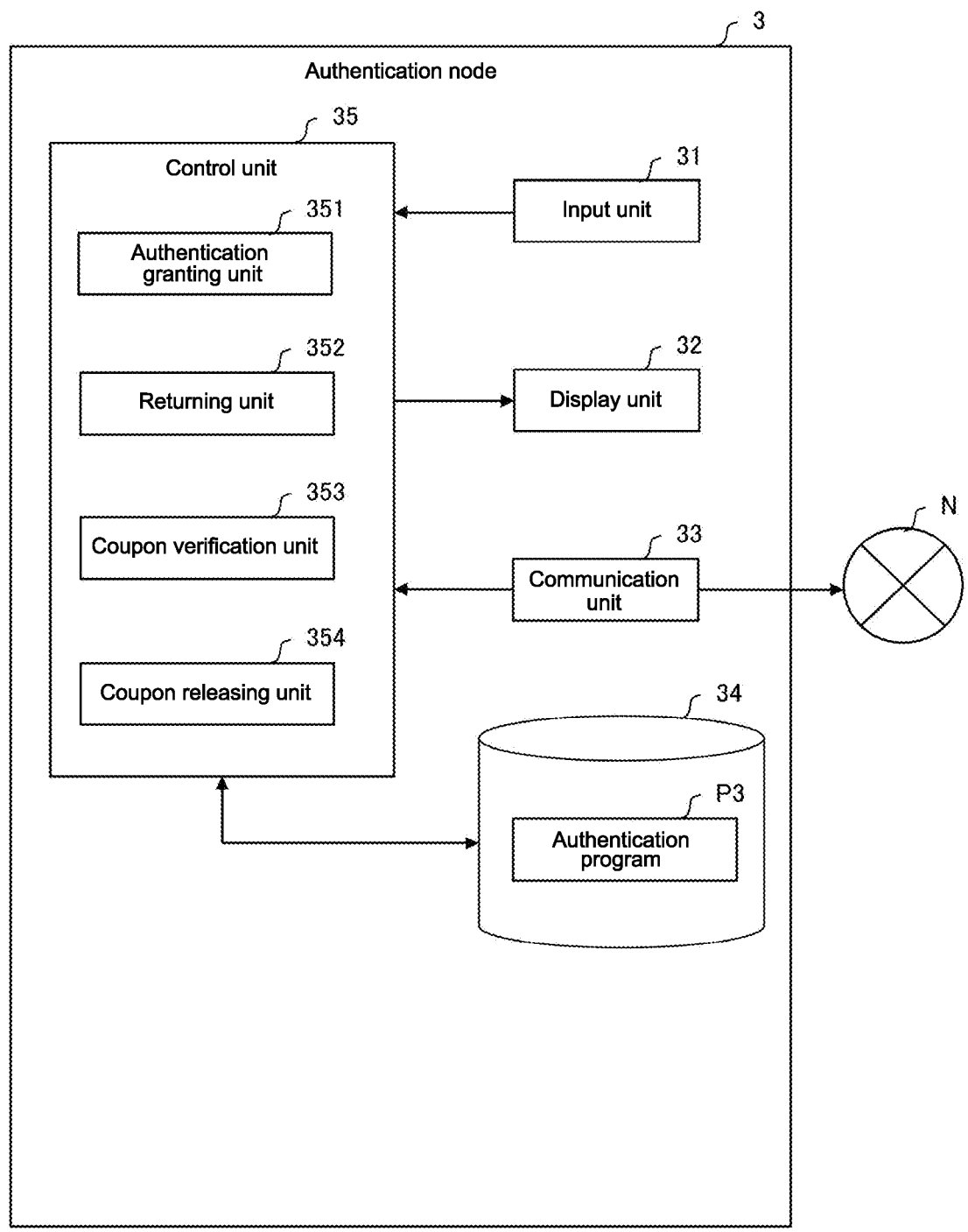
FIG. 4 is a functional block diagram illustrating the configuration of an authentication node according to the first embodiment.

FIG. 2 is a functional block diagram illustrating the configuration of the client node 1; FIG. 3 is a functional block diagram illustrating the configuration of the issuing node 2; and FIG. 4 is a functional block diagram. Illustrating the configuration of the authentication node 3.

As shown in FIG. 2, the client node 1 includes an input unit 11, a display unit 12, a communication unit 13, a storage unit 14, and a control unit 15.

The input unit 11 can be constituted by, for example, a keyboard, a mouse, or touch panel. The display unit 12 can be constituted by, for example, a liquid crystal display or an organic EL display. The communication unit 13 is an interface that allows the client node 1 to communicate with other nodes via a communication network N.

The storage unit 14 is a nonvolatile auxiliary storage device that stores various types of programs and data used by the client node 1. The storage unit 14 can be made up of, for example, a hard disk drive (HDD) or a solid-state drive (SSD).

The client program P1 according to this embodiment is stored in the storage unit 14. The client program P1 is a program that causes the client node 1 to execute a part of the processing for the coupon providing service in the information processing system 100. The method for delivering the client program P1 to the client node 1 is not particularly limited. That is, the client program P1 may be downloaded to the client node 1 via the communication network N. Alternatively, the client program P1 may be stored in a non-transitory computer-readable recording medium and then installed in the client node 1 via the recording medium. For example, in the case that a smartphone is used as the client node 1, the client program P1 can be delivered to the client node 1 via the AppStore (registered trademark) of Apple Inc. or the GooglePlay (registered trademark) of Google Inc.

The control unit 15 is represented as a functional block whose functions are performed by an arithmetic processing unit such as a CPU or a MPU included in the client node 1, which reads the client program P1 stored in the storage unit 14 to a main storage device such as a RAM to thus execute the client program P1. The control unit 15 includes a data acquisition unit 151, an authentication request unit 152, a preservation unit 153, an availability verification unit 154, and a use request unit 155. The functions of these units are described later.

As shown in FIG. 3, the issuing node 2 includes an input unit 21, a display unit 22, a communication unit 23, and a storage unit 24, and a control unit 25. The input unit 21, the display unit 22, the communication unit 23, and the storage unit 24 can be constituted in the same manner as the input unit 11, the display unit 12, the communication unit 13, and the storage unit 14 in the client node 1.

The storage unit 24 stores the issuing program P2 according to this embodiment. The issuing program P2 is a program that causes the issuing node 2 to execute a part of the processing for the coupon providing service. The method for delivering the issuing program P2 to the issuing node 2 is not particularly limited. That is, the issuing program P2 may be downloaded to the issuing node 2 via the communication network N. Alternatively, the issuing program P2 may be stored in a non-transitory computer-readable recording medium and then installed in the issuing node 2 via the recording medium.

The control unit 25 is represented as a functional block whose functions are performed by an arithmetic processing unit such as a CPU or a MPU included in the issuing node 2, which reads the client program P2 stored in the storage unit 24 to a main storage device such as a RAM to thus execute the client program P2. The control unit 25 includes a coupon issuing unit 251, a release request unit 252, a use request verification unit 253, and a use authorization unit 254. The functions of these units are described later.

As shown in FIG. 4, the authentication node 3 includes an input unit 31, a display unit 32, a communication unit 33, and a storage unit 34, and a control unit 35. The input unit 31, the display unit 32, the communication unit 33, and the storage unit 34 can be constituted in the same manner as the input unit 11, the display unit 12, the communication unit 13, and the storage unit 14 in the client node 1.

The storage unit 34 stores the authentication program P3 according to this embodiment. The authentication program P3 is a program that causes the authentication node 3 to execute a part of the processing for the coupon providing service. The method for delivering the authentication program 93 to the authentication node 3 is not particularly limited. That is, the authentication program P3 may be downloaded to the authentication node 3 via the communication network N. Alternatively, the authentication program P3 may be stored in a non-transitory computer-readable recording medium and then installed in the authentication node 3 via the recording medium.

The control unit 35 is represented as a functional block whose functions are performed by an arithmetic processing unit such as a CPU or a MPU included in the authentication node 3, which reads the client program P3 stored in the storage unit 34 to a main storage device such as a RAM to thus execute the client program P3. The control unit 35 includes an authentication granting unit 351, a returning unit 352, a coupon verification unit 353, and a coupon releasing unit 354. The functions of these units are described later.

Processing Sequence

Figure 5:
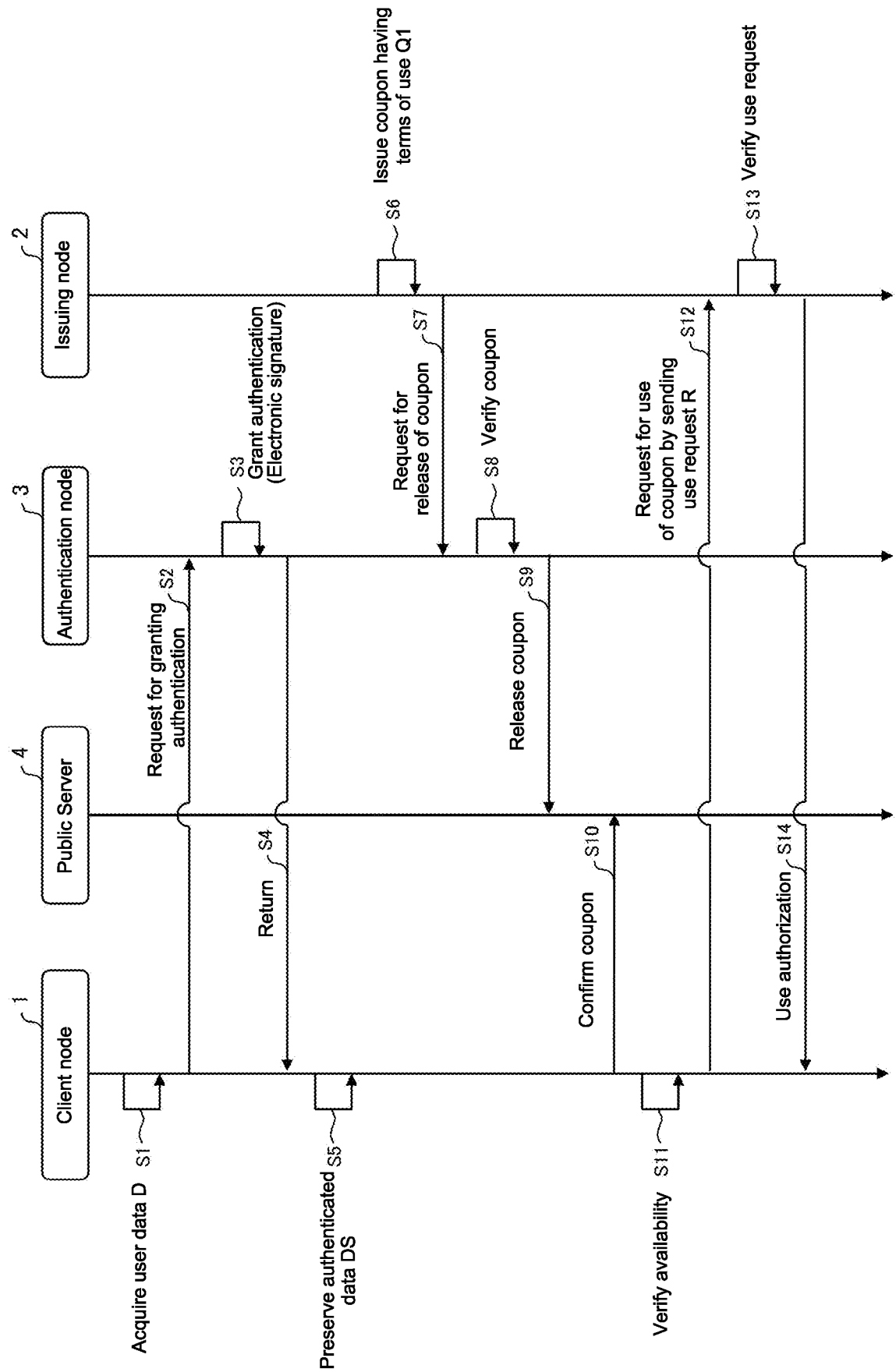
FIG. 5 is a sequence chart illustrating the processing steps of a coupon providing method in the information processing system according to the first embodiment.

FIG. 5 is a sequence chart illustrating the processing steps of a service data providing method according to this embodiment in the information processing system 100. The communication mode in each processing step is not particularly limited.

According to this embodiment, the main processing steps in FIG. 5 are executed by the control unit 15 in the client node 1, the control unit 25 in the issuing node 2, and the control unit 35 in the authentication node 3. Additionally, a user may manually execute a part of the processing steps in FIG. 5 via the input unit 11 of the client node 1, the input unit 21 of the issuing node 2, or the input unit 31 of the authentication node 3.

First, in the client node 1, the data acquisition unit 151 acquires user data D by preparing the user data in the client node 1 or by downloading the user data prepared by an external device into the client node 1 (step S1: data acquisition step). Although the user data is not particularly limited as long as the data is held by the user of the client node 1, the user data D according to this embodiment includes information associated with the user of the client node 1 and may typically include user's various types of lifelog data. For example, the user data D may include the following data:

User's movement history recorded by smartphone or GPS logger

Visit history to particular places (data received from Bluetooth beacons, captured images of landmarks)

Web usage history (history data held by web browser)

Amount of exercise and heart rate history data recorded by wearable terminal

Usage history of smartphone and PC (log in and log out time, application startup history, file access history and so forth)

Usage history of calls, SNS, and mails (time and date of usage start and end, actual transmitting and receiving data)

History of mobile payments

Image and video files for landscapes and persons (with metadata such as shooting time and date, places)

Purchase history of goods (receipt images, order confirmation mails)

Additionally, when the user data D is made up of movement history data, the user data D is a part or the whole of the following data set:

Information about product name of used GPS logger device and software

Information about data format

Information about right holder (user's public key and so forth)

Time and data, location information prepared at regular intervals

According to this embodiment, the user data D is the movement history of a user and for example, a UPS logger can be the data acquisition unit 151.

The authentication request unit 152 in the client node 1 then sends the user data D to the authentication node and requests to the authentication node 3 to grant authentication for the validity of the user data D (step S2, authentication request step).

Subsequently, when receiving the request from the authentication request unit 152, the authentication granting unit 351 in the authentication node 3 grants authentication for the validity of the user data D (step S3, authentication granting step). Although the form of authentication is not particularly limited, the authentication granting unit 351 according to this embodiment performs validity authentication in the form of an electronic signature S prepared by the authentication node 3.

Subsequently, the returning unit 352 in the authentication node 3 returns the user data D (authenticated user data DS) to which the electronic signature S is applied (step S4). Upon receiving the authenticated user data DS, the preservation unit 153 in the client node 1 preserves the authenticated user data. DS in the storage unit 14 (step S5). The authenticated user data DS is a data set, including the following data:
User data D
Electronic signature S user data D prepared by authentication node 3

Hereinafter, the authenticated user data DS is simply referred to as "data DS".

Thereafter, the coupon issuing unit 251 in the issuing node 2 issues a digital coupon (hereinafter, simply referred to as "coupon") having terms of use Q1 in accordance with user's operation or the like (step S6). The terms of use Q1 includes an available period, a maximum number of issued coupons, data to be required and so forth. According to this embodiment, the data to be required may be a movement history exhibiting that the user is located at a specific location (for example, Sendai-city) within a prescribed period. (for example, for three days from Jan. 1, 2019).

Subsequently, the release request unit 252 in the issuing node 2 requests to the authentication node 3 to release the issued coupon (step S7). Upon the request, the coupon verification unit 353 in the authentication node 3 verifies the content of the coupon (step S8) and the coupon releasing unit 354 uploads the coupon to the public server 4 to release the coupon, unless the content of the coupon as contrary to public order, morality or the like (step S9). Thereby, the user of the client node 1 can confirm the issuance of the coupon (step S10).

At this time, the availability verification unit 154 in the client node 1 verifies whether or not data satisfying the terms of use Q1 of the released coupon is present in the data DS stored in the storage unit 14 (step S11). If there is data DS that satisfies the terms of use Q1, the availability verification unit 154 notifies the user as such.

In the case that a coupon which the user of the client node 1 wishes to use is present among available coupons, the use request unit 155 presents a use request R to the issuing node 2 in accordance with a user's operation, thereby requesting to use the coupon (step S12, use request step). More specifically, the use request R is a data set including, for example, the following data groups:
Identifier (ID) of coupon which user of client node 1 wishes to use User data DS
Electronic signature with respect to "identifier ID of coupon" prepared based on secret key associated with user's public key described in user data D (Certification of intent to use coupon by right holder (user) of user data D)

Subsequently, in the issuing node 2, upon the use request R from the use request unit 155, the use request verification unit 253 verifies whether the information associated with the user (the movement history of the user) included in the data DS satisfies the terms of use Q1, whether the authentication is granted, and whether the electronic signature with respect to "the identifier ID of the coupon" prepared by the secret key associated with the public key of the user described in the user data D is valid (step S13, use request verification step). According to this embodiment, the use request verification unit 253 verifies whether or not the user is present at the specific location within the prescribed period by collating the movement history of the user with the prescribed period and the specific location included in the terms of use Q1.

Subsequently, if it is determined that the information satisfies the terms of use Q1 and the use request is valid, the use authorization unit 254 in the issuing node 2 authorizes the use of the coupon to the client node 1 (step S14, use authorization step). This allows the user of the client node 1 to download the use authorization data in the coupon into the client node 1, thereby making it possible, for example, to display a QR image that proves the use authorization of the coupon on the display unit 12. Additionally, if it is determined that the information fails to satisfy the terms of use Q1 or none of the authentication is granted, the use authorization unit 254 notifies the client node 1 that the use of the coupon is rejected.

Summary of this Embodiment

As described above, in the information processing system 100, the issuing node 2 issues a coupon having terms of use Q1; the client node 1 requests to use the coupon to the issuing node 2 by presenting the user data D; and the issuing node 2 authorizes the use of the coupon in the case that the information associated with the user included in the user data D satisfies the terms of use Q1. This allows only specific users who satisfy the terms of use Q1 to receive the coupons, thereby making it possible to issue more strategic coupons. As such, coupons can be provided more effectively compared to the prior art.

Further, the authentication node 3 verifies the validity of the user data D and thereafter grants the authentication, and thus can prevent fraud such as forgery of the user data D.

In FIG. 5, although the processing in steps S1 to S5 is executed before the coupon is issued, the processing in steps S1 to S5 may be executed after the coupon is issued in the case that the prescribed period described by the terms of use Q1 includes a period after the issuance of the coupon.

Further, the issuing node 2 may upload the coupon into the public server 4 without the authentication node 3 instead of executing the processing in steps S7 to S9. Alternatively, the issuing node 2 may notify the issuance of the coupon to the client node 1 via mail delivery or the like instead of executing the processing in steps S7 to S9.

Further, the use request unit 155 in the client node 1 may request to use the coupon by skipping the processing in steps S2 to S5 and presenting the user data D to which the authentication yet to be granted to the issuing node 2 in step S12. However, the client, node 1 cannot change the date of the electronic signature S, and thus it is desirable to include the execution of the processing in steps S2 to S5 into the terms of use Q1 in order to prevent the forgery of the user data D.

Second Embodiment

According to a second embodiment, an aspect of increasing user's privacy or the like is described. Note that constituent elements that have functions identical to the constituent elements in the first embodiment are given the same reference numerals and a description of features that are identical to the first embodiment are omitted.

System Configuration

Figure 6:
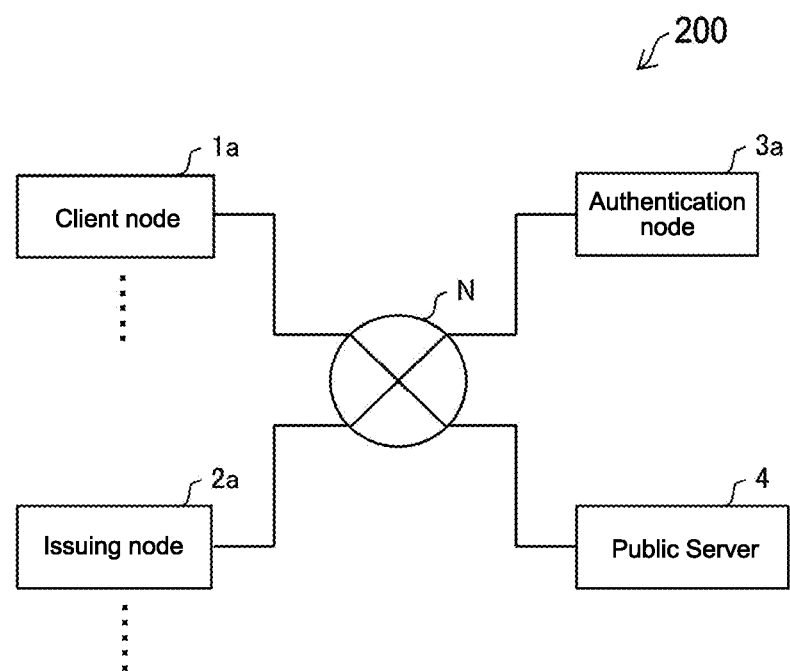
FIG. 6 schematically illustrates an information processing system according to a second embodiment.

FIG. 6 schematically illustrates an information processing system 200 according to a second embodiment. The information processing system 200 includes a client node 1a, an issuing node 2a, an authentication node 3a, and a public server 4. The client node 1a, the issuing node 2a, the authentication node 3a, and the public server 4 are connected to communicate with each other wired or wirelessly via a communication network N such as the internet.

The client node 1a is an information processing device managed by a user who uses digital coupons. The hardware configuration of the client node 1a is identical to the hardware configuration of the client node 1 according to the first embodiment.

The issuing node 2a is an information processing device which is managed by a business operator or the like who issues digital coupons. The hardware configuration of the issuing node 2a is identical to the hardware configuration of the issuing node 2 according to the first embodiment.

The authentication node 3a is an information processing device managed by a service provider that performs coupon providing service. The hardware configuration of the authentication node 3a is identical to the hardware configuration of the authentication node 3 according to the first embodiment.

Configuration of Each Node

Figure 7:
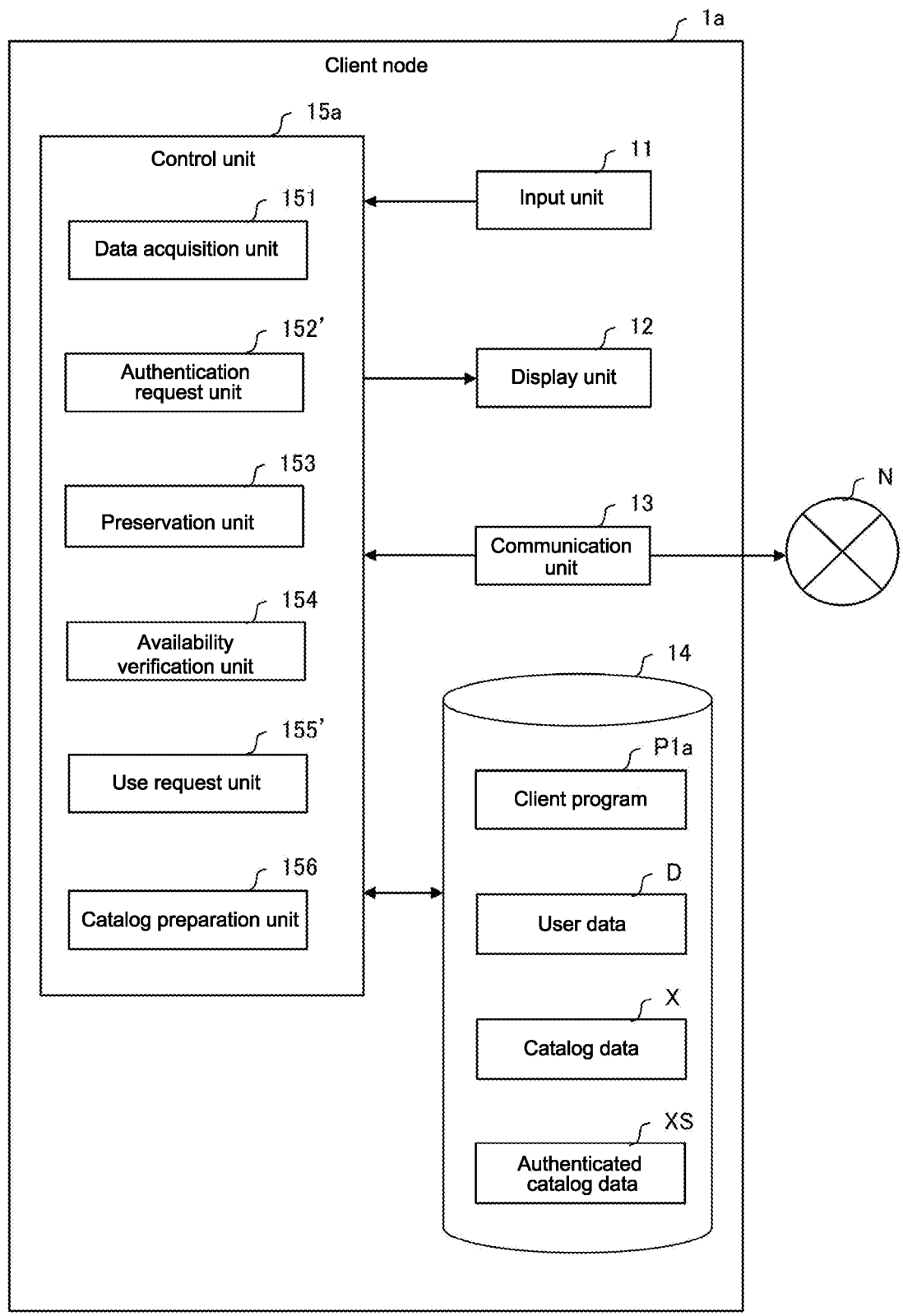
FIG. 7 is a functional block diagram illustrating the configuration of a client node according to the second embodiment.
Figure 8:
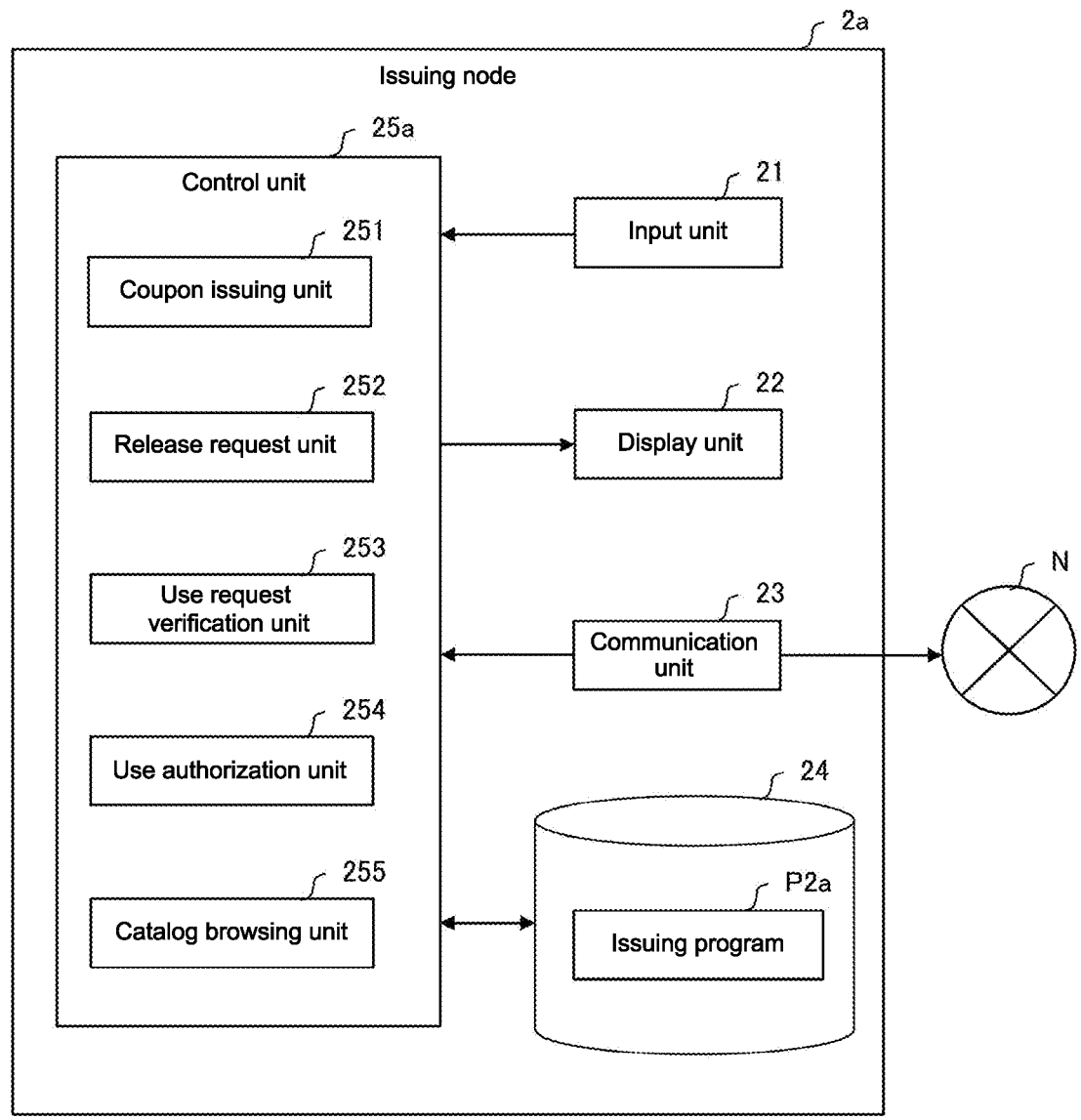
FIG. 8 is a functional block diagram illustrating the configuration of an issuing node according to the second embodiment.
Figure 9:
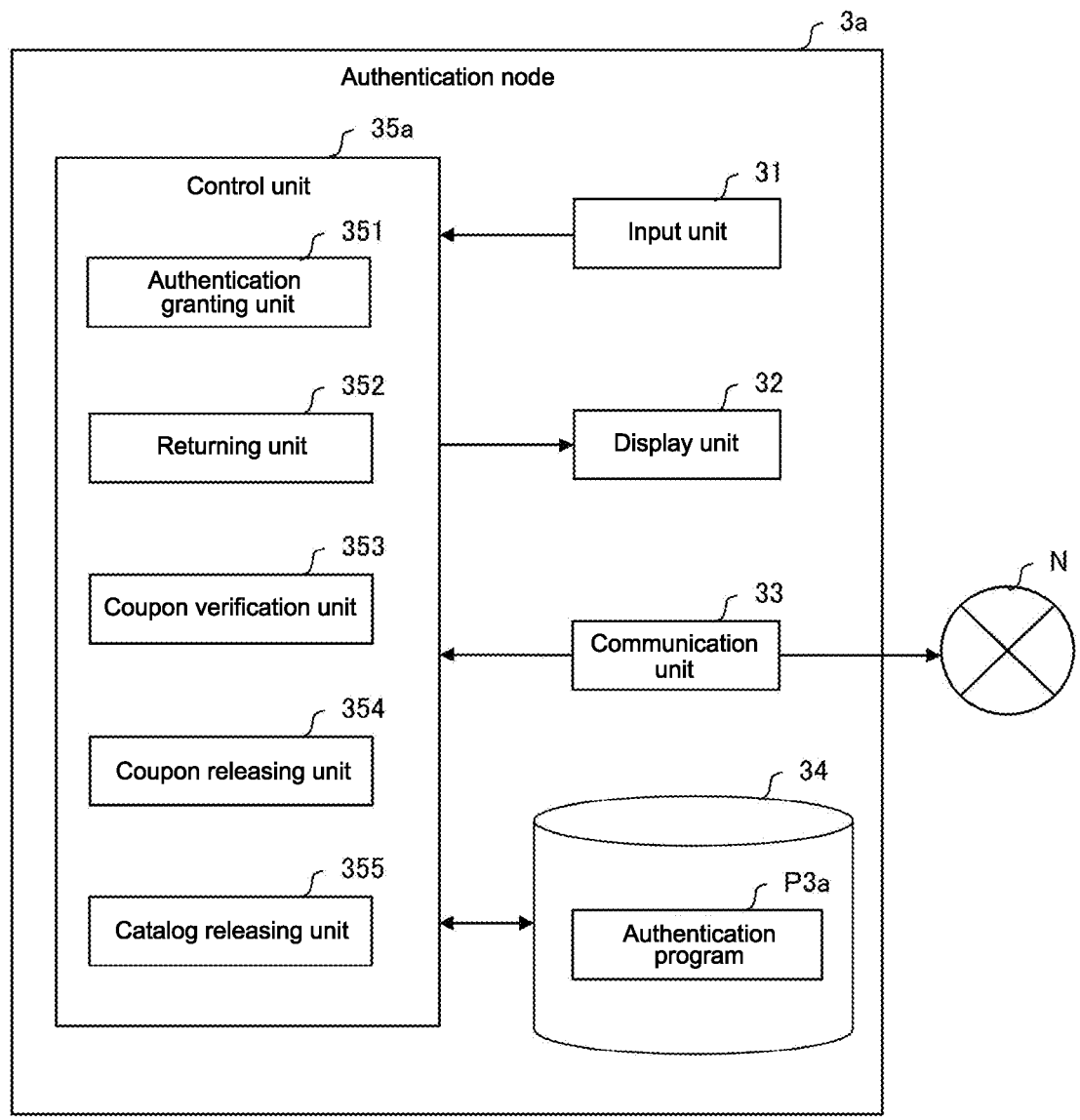
FIG. 9 is a functional block diagram illustrating the configuration of an authentication node according to the second embodiment.

FIG. 7 is a functional block diagram illustrating the configuration of the client node 1a; FIG. 8 is a functional block diagram illustrating the configuration of the issuing node 2a; and FIG. 9 is a functional block diagram illustrating the configuration of the authentication node 3a.

As shown in FIG. 7, the client node 1a includes an input unit 11, a display unit 12, a communication unit 13, a storage unit 14, and a control unit 15a. That is, the client node 1a has a configuration in which the control unit 15 is replaced by the control unit 15a in the client node 1 shown in FIG. 2.

A client program P1a according to this embodiment is stored in the storage unit 14.

The control unit 15a is represented as a functional block whose functions are performed an arithmetic processing unit such as a CPU or a MPU included in the client node 1a, which reads the client program P1a stored in the storage unit 14 to a main storage device such as a RAM to thus execute the client program P1a. The control unit 15a includes a data acquisition unit 151, an authentication request unit 152', a preservation unit 153, an availability verification unit 154, a use request unit 155' and a catalog preparation unit 156. That is, the control unit 15a has a configuration in which the authentication request unit 152 and the use request unit 155 is replaced by the authentication request unit 152' and the use request unit 155', respectively and the catalog prepara-tion unit 156 is further provided in the control unit shown in FIG. 2. The functions of these units are described later.

As shown in FIG. 8, the issuing node 2a includes an input unit 21, a display unit 22, a communication unit 23, and a storage unit 24, and a control unit 25a. That is, the issuing node 2a has a configuration in which the control unit 25 is replaced by the control unit 25a in the issuing node 2 shown in FIG. 3.

The issuing program P2a according to this embodiment is stored in the storage unit 24.

The control unit 25a is represented as a functional block whose functions are performed by an arithmetic processing unit such as a CPU or a MPU included in the issuing node 2a, which reads the issuing program P2a stored in the storage unit 24 to a main storage device such as a RAM to thus execute the issuing program P2a. The control unit 25a includes a coupon issuing unit 251, a release request unit 252, a use request verification unit 253, a use authorization unit 254, and a catalog browsing unit 255. That is, the control unit 25a has a configuration in which the catalog browsing unit 255 further provided in the control unit 25 shown in FIG. 3. The functions of these units are described later.

As shown in FIG. 9, the authentication node 3a includes an input unit 31, a display unit 32, a communication unit 33, a storage unit 34, and a control unit 35a. That is, the authentication node 3a has a configuration in which the control unit 35 is replaced by the control unit 35a in the authentication node 3 shown in FIG. 4.

The authentication program P3a according to this embodiment is stored in the storage unit 34.

The control unit 35a is represented as a functional block whose functions are performed by an arithmetic processing unit such as a CPU or a MPU included in the authentication node 3a, which reads the authentication program P3a stored in the storage unit 34 to a main storage device such as a RAE to thus execute the authentication program P3a. The control unit 35a includes an authentication granting unit 351, a returning unit 352, a coupon verification unit 353, a coupon releasing unit 354, and a catalog releasing unit 355. That is, the control unit 35a has a configuration in which the catalog releasing unit 355 is further provided in the control unit 35 shown in FIG. 4. The functions of these units are described later.

Processing Sequence

Figure 10:
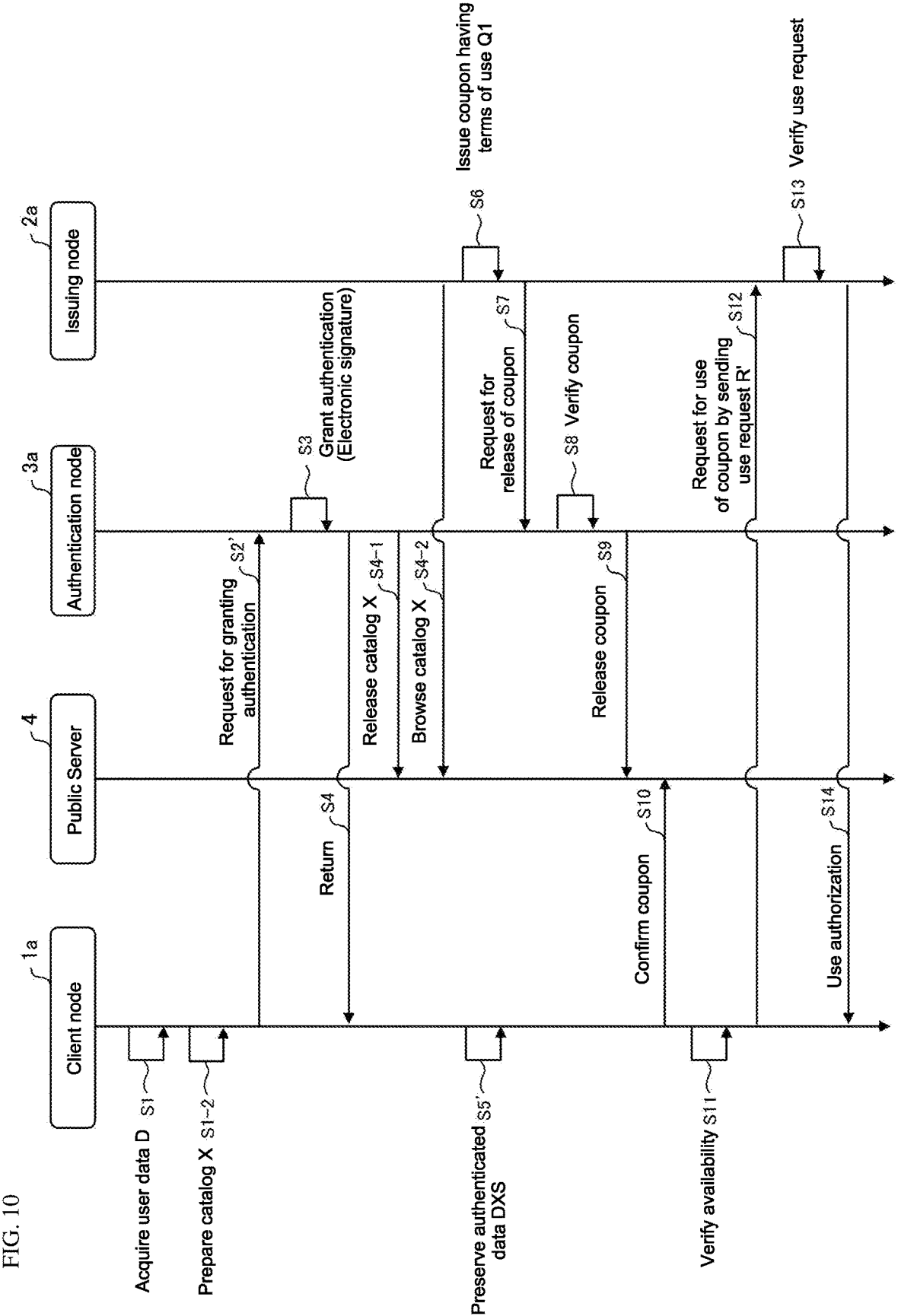
FIG. 10 is a sequence chart illustrating the processing steps of a coupon providing method in the information processing system according to the second embodiment.

FIG. 10 is a sequence chart illustrating the processing steps of a service data providing method according to this embodiment in the information processing system 200. The communication mode in each processing step is not particularly limited. Note that processing steps identical to the processing steps in the service data providing method according to the first embodiment are given the same reference numerals.

According to this embodiment, the main processing steps in FIG. 10 are executed by the control unit 15a in the client node 1a, the control unit 25a in the issuing node 2a, and the control unit 35a in the authentication node 3a. Additionally, a user may manually execute a part of the processing steps in FIG. 10 via the input unit 11 in the client node 1a, the input unit 21 in the issuing node 2a, or the input unit 31 in the authentication node 3a.

First, in the client node 1a, the data acquisition unit 151 acquires user data D including information associated with the user of the client node 1a by preparing the user data D in the client node 1a or by downloading the user data D prepared by an external device into the client node 1*a* (step S1: data acquisition step). The user data D can be identical to the user data D according to the first embodiment.

Subsequently, the catalog preparation unit 156 prepares catalog data X from the user data D (step S1-2). The catalog data X is created by anonymizing and generalizing the user data. D, and adding information associated with the right holder to the user data D. In the case that the user data D is movement history data, the catalog data X is a part or the whole of the following data groups.
Hash of user data D
Data format information
Information associated with right holder (user's public key and so forth)
User identification information (nationality, gender, age, occupation and so forth)
Recoding start and end date and time
Movement distance
Brief description about places (city, town, village) where user visited and/or stayed during recording If user data D is a web usage history, the catalog data X is, for example, a part or the whole of the following data:
Hash of user data D
Information associated with right holder (user's public key and so forth
User identification information (nationality, gender, age, occupation and so forth)
Recoding start and end date and time
Number of web searches
Number of visited websites
Language of visited website Subsequently, the authentication request unit 152' in the client node 1*a* sends the catalog data X to the authentication node 3*a* and requests to the authentication node 3*a* to grant authentication for the validity of the catalog data X (step S2', authentication request step).

Subsequently, upon the request from the authentication request unit 152', the authentication granting unit 351 of the authentication node 3*a* grants authentication for the validity of the catalog data X (step S3, authentication granting step). The form of authentication is not particularly limited, but according to this embodiment, the authentication granting unit 351 performs validity authentication in the form of an electronic signature S.

Subsequently, the returning unit 352 in the authentication node 3*a* returns the catalog data X with the electronic signature S (authenticated catalog data XS) (step S4).

The catalog releasing unit 355 in the authentication node 3*a* uploads the catalog data X to the public server 4 to release the catalog data X (step S4-1). This allows the catalog browsing unit 255 in the issuing node 2*a* to browse the catalog data X (step S4-2).

As such, a lot of catalog data X is accumulated in the public server 1 by the authentication node 3*a* uploading catalog data X sent from many and unspecified client nodes 1*a*. The issuing node 2*a* may determine the terms of use Q1 of coupons by reference to the information of the catalog data X accumulated in the public server 4.

The order of step S4 and S4-1 is not particularly limited.

Upon receiving the authenticated catalog data XS returned from the authentication node 3*a*, the preservation unit 153 in the client node 1*a* preserves the authenticated catalog data XS in the storage unit 14 together with the user data D mapped to the authenticated catalog data XS (step S5').

Hereinafter, the authenticated catalog data XS is simply referred to as "data XS".

Thereafter, the processing steps in steps S6 to S10 are identical to those in the first embodiment. In step S11, the availability verification unit 154 in the client node 1*a* verifies whether or not data that satisfies the terms of use Q1 is present in the data XS and the user data D stored in the storage unit 14. In the case that a coupon which the user of the client node 1*a* wishes to use is present in available coupons, the use request unit 155' presents a use request R' to the issuing node 2*a* in accordance with user's operation, thereby requesting the use of the coupon (step S12, use request step). More specifically, the use request R' is a set of data consisting of the following data groups:
Identifier (ID) of coupon which user of client node 1 wishes to use
Either one or both of data XS and user data D
Electronic signature with respect to "identifier ID of coupon" prepared based on secret key associated with user's public key described in user data D or data XS Certification of Intent to Use Coupon by Right
Holder (User) of User Data D Subsequently, upon the use request R' from the use request unit 155', the use request verification unit 253 in the issuing node 2*a* verifies whether or not the information. (user's movement history) associated with the user included in the evidence data presented satisfies the terms of use Q1 (step S13, use request verification step).

Subsequently, if it is determined that the information satisfies the terms of use Q1 and the use request is valid, the use authorization unit 254 in the issuing node 2*a* authorizes the use of the coupon to the client node 1*a* (step S14, use authorization step). This allows the user of the client node 1*a* to download the usage ticket data of the coupon into the client node 1*a*, thereby making it possible, for example, to display a QR image that proves the usage ticket of the coupon on the display unit 12. Additionally, if it is determined that the information fails to satisfy the terms of use Q1 or none of the authentication is granted, the use authorization unit 254 notifies the client node 1*a* that the use of the coupon is rejected.

Summary of this Embodiment

As described above, in the information processing system 200, the issuing node 2*a* authorizes the use of a coupon in the case that the information associated with a user included in a catalog data X satisfies the terms of use Q1, and thus it is possible to provide coupons to limited users who can satisfy the terms of use Q1 as is the case with the first embodiment. Furthermore, according to this embodiment, the user of the client node 1*a* may only present the catalog data X instead of the user data D when requesting to authenticate and requesting to use a coupon, thereby protecting the privacy of the user.

Further, the user of the issuing node 2*a* can issue coupons by reference to the catalog data X accumulated in the public server 4, and therefore can use the catalog data X as a business tool.

The processing steps in steps S1 to S5' may be executed after the coupon is issued also in this embodiment. Further, the issuing node 2*a* may upload coupons to the public server 4 without involving the authentication node 3*a* instead of executing the processing steps in step S7 to S9. Alternatively, the issuing node 2*a* notifies the issue of coupons to the client node 1*a* via mail delivery or the like instead of executing the processing steps in step S7 to S9. Additionally, the use request unit 155' in the client node 1a may request to use a coupon by presenting the catalog data X, which is yet to be authenticated, to the issuing node 2a in step S12 while skipping the processing steps in steps S2 to S5'.

Third Embodiment

In a third embodiment, an aspect of increasing transparency and fairness using blockchain technology is described. Note that constituent elements that have functions identical to the constituent elements in the first and the second embodiments are given the same reference numerals and a description of features that are identical to the first and the second embodiments are omitted.

System Configuration

Figure 11:
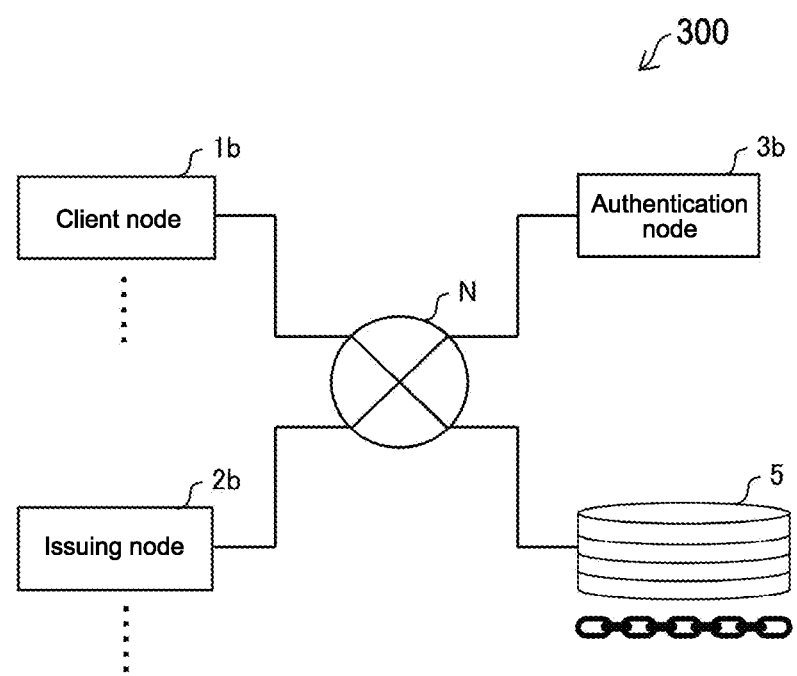
FIG. 11 schematically illustrates an information processing system according to a third embodiment.

FIG. 11 schematically illustrates an information processing system 300 according to a third embodiment. The information processing system 300 includes a client node 1b, an issuing node 2b, an authentication node 3b, and a blockchain 5. The client node 1b, the issuing node 2b, the authentication node 3b, and the blockchain 5 are connected to communicate with each other wired or wirelessly via a communication network N such as the internet.

The client node 1b is an information processing device managed by a user who uses digital coupons. The hardware configuration of the client node 1b is identical to the hardware configuration of the client node 1 according to the first embodiment.

The issuing node 2b is an information processing device which issues digital coupons having terms of use. The hardware configuration of the issuing node 2b is identical to the hardware configuration of the issuing node 2 according to the first embodiment.

The authentication node 3b is an information processing device managed by a service provider that performs coupon providing service. The hardware configuration of the authentication node 3b is identical to the hardware configuration of the authentication node 3 according to the first embodiment.

The blockchain 5 gathers, on a regular basis, information (transaction) groups on trades and contracts executed among all the nodes located in the information processing system 300 and makes the gathered information into blocks; each block is connected like a chain with evidence information described in each block, the evidence information proving that each block satisfies a connection condition with an immediately preceding block. The block chain 5 records all the transactions up to now, which are separately managed by a node group located in the information processing system 300. The information processing system 300 can make a transaction via its own crypto currency. Examples of such crypto currencies include Bitcoin, Ethereum or the like.

Configuration of Each Node

Figure 12:
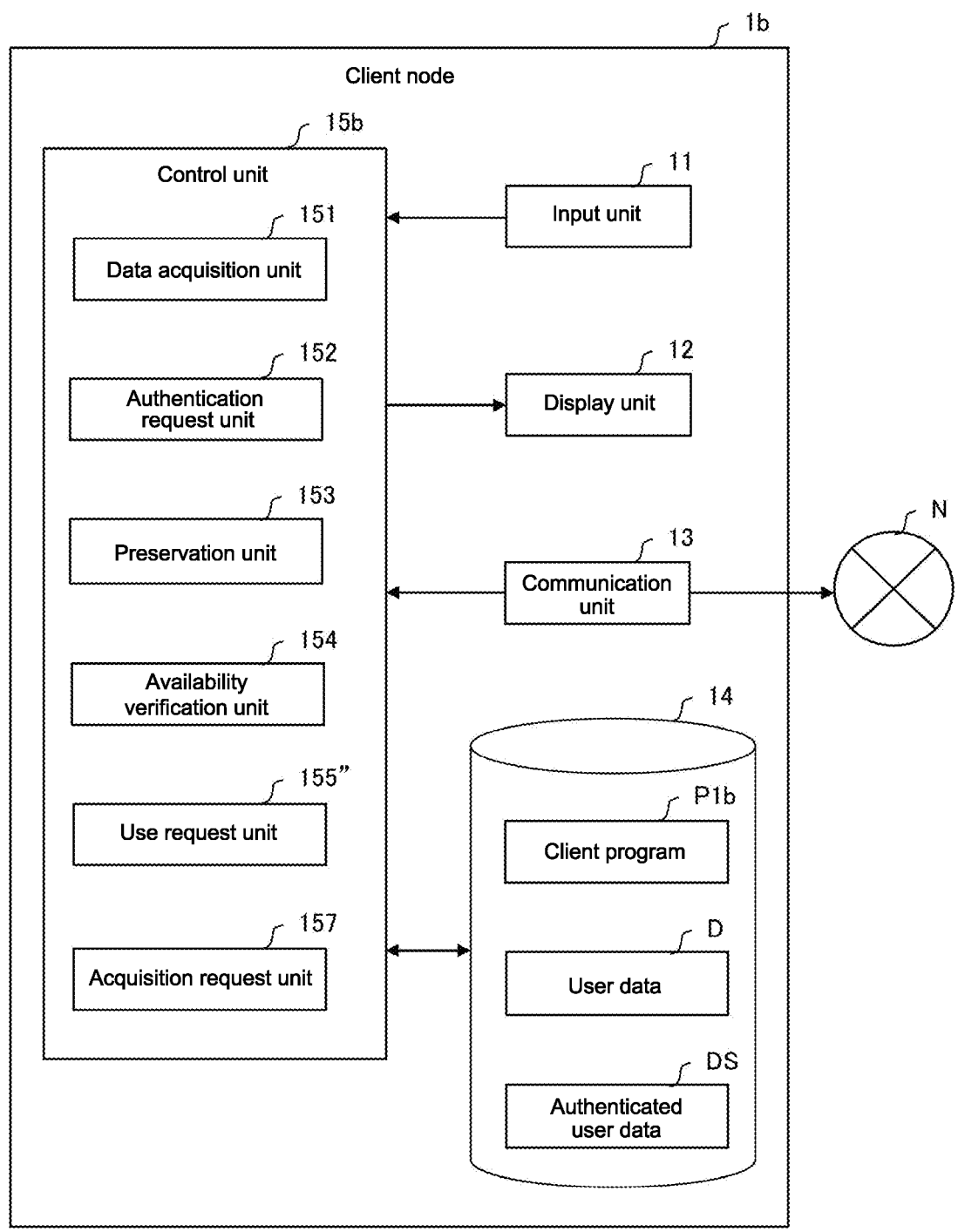
FIG. 12 is a functional block diagram illustrating the configuration of a client node according to the third embodiment.
Figure 13:
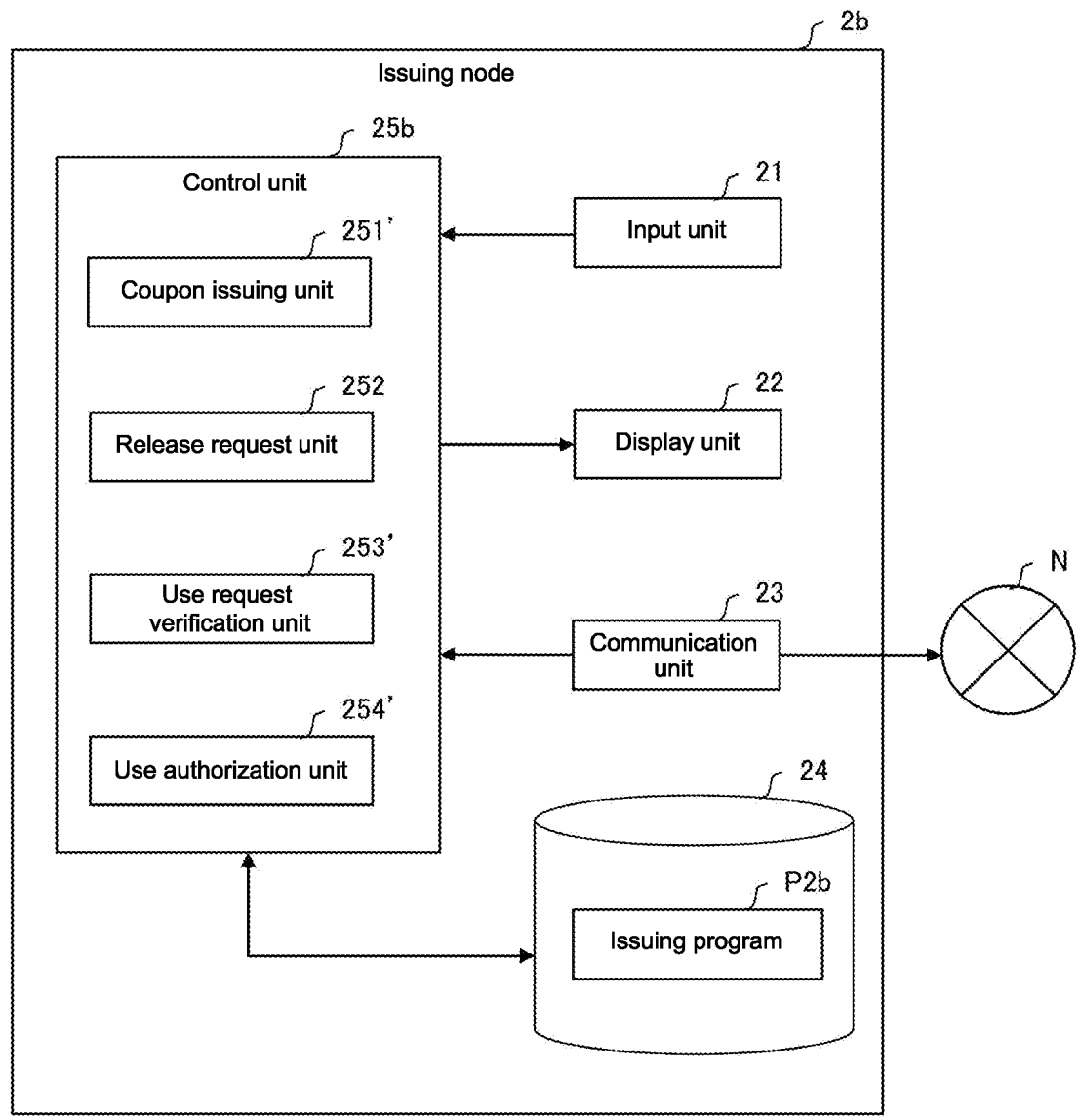
FIG. 13 is a functional block diagram illustrating the configuration of an issuing node according to the third embodiment.
Figure 14:
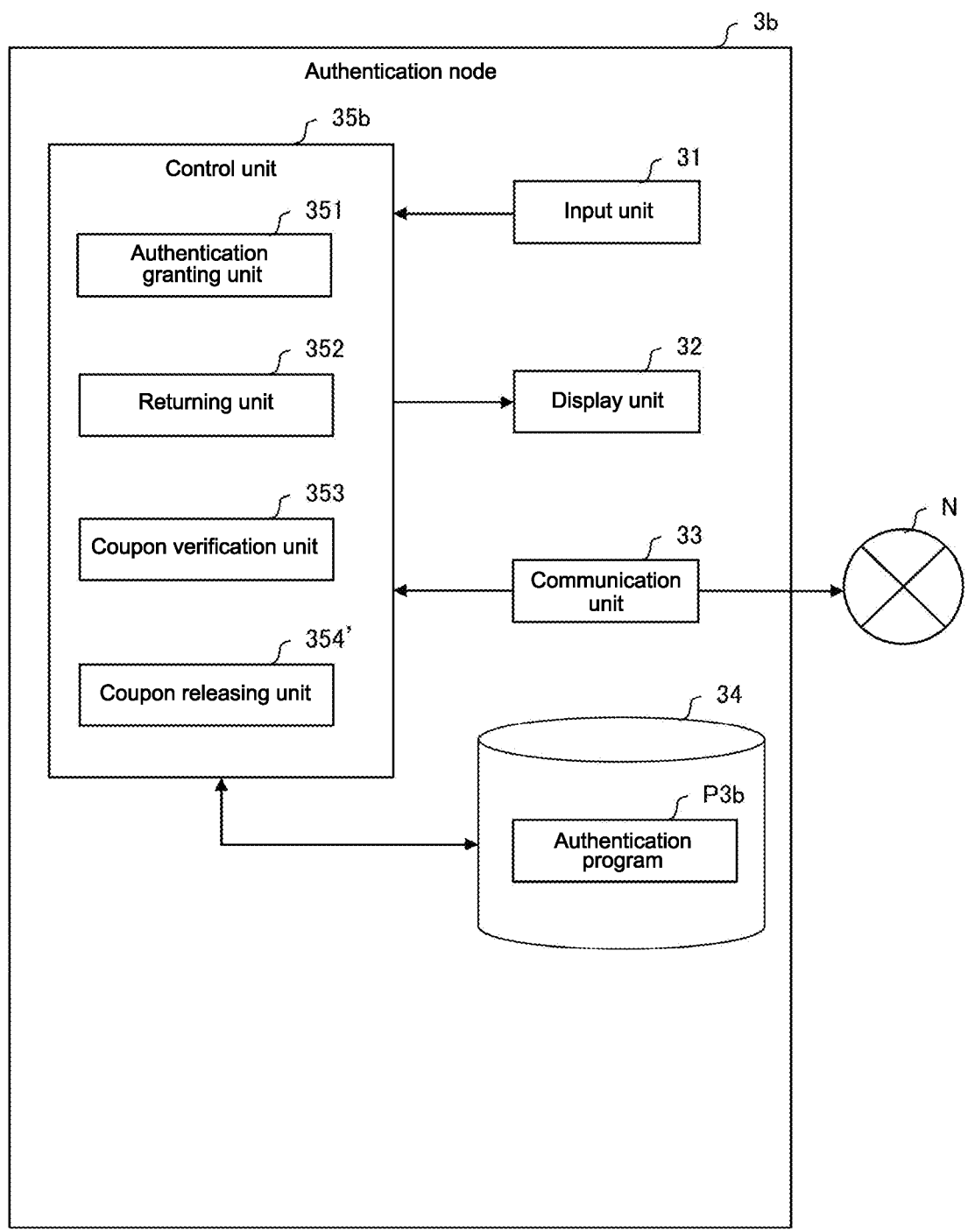
FIG. 14 is a functional block diagram illustrating the configuration of an authentication node according to the third embodiment.

FIG. 12 is a functional block diagram illustrating the configuration of the client node 1b; FIG. 13 is a functional block diagram illustrating the configuration of the issuing node 2b; and FIG. 14 is a functional block diagram illustrating the configuration of the authentication node 3b.

As shown in FIG. 12, the client node 1b includes an input unit 11, a display unit 12, a communication unit 13, a storage unit 14, and a control unit 15b. That is, the client node 1b has a configuration in which the control unit 15 is replaced by the control unit 15b in the client node 1 shown in FIG. 2.

A client program P1b according to this embodiment is stored in the storage unit 14.

The control unit 15b is represented as a functional block whose functions are performed by an arithmetic processing unit such as a CPU or a MPU included in the client node 1b, which reads the client program P1b stored in the storage unit 14 to a main storage device such as a to thus execute the client program P1b. The control unit 15b includes a data acquisition unit 151, an authentication request unit 152, a preservation unit 153, an availability verification unit 154, a use request unit 155" and an acquisition request unit 157. That is, the control unit 15b has a configuration in which the use request unit 155 is replaced by the use request unit 155" and the acquisition request unit 157 is further provided in the control unit 15 shown in FIG. 2. The functions of these units are described later.

As shown in FIG. 13, the issuing node 2b includes an input unit 21, a display unit 22, a communication unit 23, a storage unit 24, and a control unit 25b. That is, the issuing node 2b has a configuration in which the control unit 25 is replaced by the control unit 25b in the issuing node 2 shown in FIG. 3.

The issuing program P2b according to this embodiment is stored in the storage unit 24.

The control unit 25b is represented as a functional blocs whose functions are performed by an arithmetic processing unit such as a CPU or a MPU included in the issuing node 2b, which reads the issuing program P2b stored in the storage unit 24 to a main storage device such as a RAM to thus execute the issuing program P2b. The control unit 25b includes a coupon issuing unit 251', a release request unit 252, a use request verification unit 253', and a use authorization unit 254'. That is, the control unit 25b has a configuration in which the coupon issuing unit 251, the use request verification unit 253, and the use authorization unit 254 are replaced by the coupon issuing unit 251', the use request verification unit 253', and the use authorization unit 254' respectively in the control unit 25 shown in FIG. 3. The functions of these units are described later.

As shown in FIG. 14, the authentication node 3b includes an input unit 31, a display unit 32, a communication unit 33, a storage unit 34, and a control unit 35b. That is, the authentication node 3b has a configuration in which the control unit 35 is replaced by the control unit 35b in the authentication node 3 shown in FIG. 4.

The authentication program P3b according to this embodiment is stored in the storage unit 34.

The control unit 35b is represented as a functional block whose functions are performed by an arithmetic processing unit such as a CPU or a MPU included in the authentication node 3b, which reads the authentication program P3b stored in the storage unit 34 to a main storage device such as a RAM to thus execute the authentication program P3b. The control unit 35b includes an authentication granting unit 351, a returning unit 352, a coupon verification unit 353, and a coupon releasing unit 354'. That is, the control unit 35b has a configuration in which the coupon releasing unit 354 is replaced by the coupon releasing unit 354' in the control unit 35 shown in FIG. 4. The functions of these units are described later.

Processing Sequence

Figure 15:
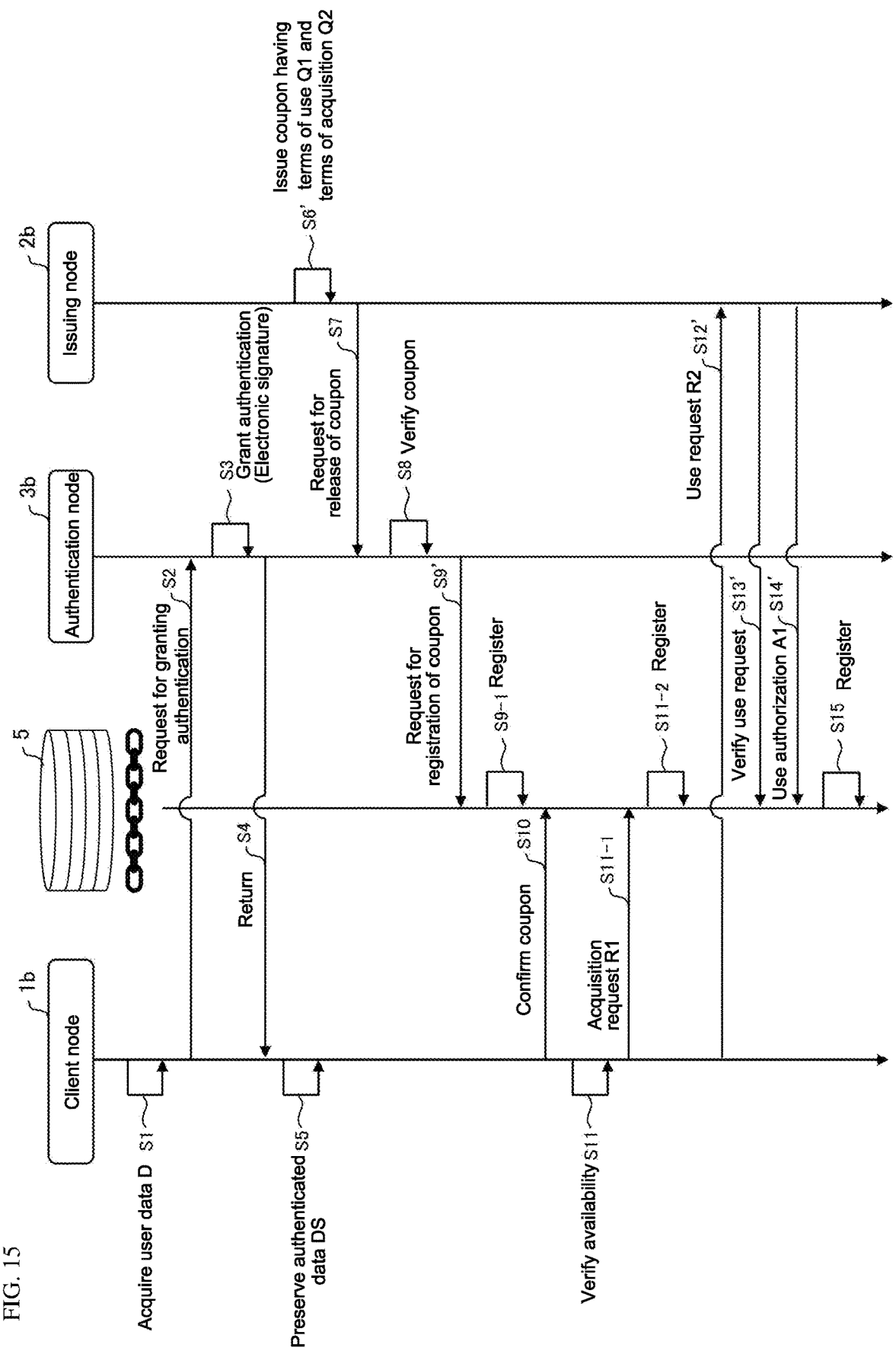
FIG. 15 is a sequence chart illustrating the processing steps of a coupon providing method in the information processing system according to the third embodiment.

FIG. 15 is a sequence chart illustrating the processing steps of a service data providing method according to this embodiment in the information processing system 300. The communication mode in each processing step is not particularly limited. Note that processing steps identical to the processing steps in the service data providing method according to the first and the second embodiments are given the same reference numerals.

According to this embodiment, the main processing steps in FIG. 15 are executed by the control unit 15b in the client node 1b, the control unit 25b in the issuing node 2b, and the control unit 35b in the authentication node 3b. Additionally, a user may manually execute a part of the processing steps in FIG. 15 via the input unit 11 in the client node 1b, the input unit 21 in the issuing node 2b, or the input unit 31 in the authentication node 3b.

First steps of steps S1 to S5 are identical to those in the first embodiment shown in FIG. 5. In step S6', the coupon issuing unit 251' in the issuing node 2b issues a coupon having the terms of use Q1 and terms of acquisition Q2 in accordance with user's operation or the like. The terms of acquisition Q2 can be the same as the terms of use Q1.

Subsequently, the release request unit 252 in the issuing node 2b requests to the authentication node 3b to release an issued coupon (step S7). Upon the request, the coupon verification unit 353 in the authentication node 3b verifies the content of the coupon (step S8), and if the content has no problem, the coupon releasing unit 354' requests to register the coupon on the blockchain 5 in order to release the coupon (step S9'). Given that the coupon is approved by miners (users registered on the blockchain 5) and registered on the blockchain 5 (step S9-1), the coupon is released, and thus the user of the client node 1b can confirm the issuance of the coupon (step S10).

At this time, the availability verification unit 154 in the client node 1b verifies whether or not data that satisfies the terms of use Q1 and the terms of acquisition Q2 is present in the data DS stored in the storage unit 14 (step S11). In the case that the data DS that satisfies the terms of use Q1 and the terms of acquisition Q2 is present, the availability verification unit 154 notifies the user as such.

In the case that a coupon which the user of the client node 1b wishes to use is present in available coupons, the acquisition request unit 157 presents the data DS to the blockchain 5 in accordance with user's operation, thereby requesting to register an acquisition request R1 for the coupon on the blockchain 5 (step S11-1, acquisition request step). The miners on the blockchain 5 verify whether or not the information included in the data DS satisfies the terms of acquisition Q2 and register the acquisition request R1 on the blockchain 5 given that the information satisfies the terms of acquisition Q2 (step S11-2). This completes the acquisition of the coupon.

The acquisition request R1 is a set of the following data groups:
Identifier (ID) of coupon already registered on blockchain 5 which user wishes to acquire
Hash of user data D
Public key of acquirer
Evidence of satisfying terms of acquisition Q2 (for example, user data D and its electronic signature S determined as terms of acquisition)

The public key of an acquirer can be the same as the public key of the user. Further, in order to increase the anonymity of the user, the public key of the acquirer may be changed at every time of use instead of using the same public key over and over again.

The evidence of satisfying terms of acquisition. Q2 in the case of using the catalog data X as in the second embodiment, may include the following data:
Catalog data X and its electronic signature S or
Certificate (electronic signature by verifier) proving satisfaction of conditions, which is prepared by verifier (generally service provider or coupon issuer)

Subsequently, in order that the user of the client node 1b uses the coupon, the use request unit 155" in the client node 1b presents the use request R2 corresponding to the acquisition request R1 registered on the blockchain 5 to the issuing node 2b, thereby requesting to use the coupon (step S12'). More specifically, the use request R2 is a set of data consisting of, for example, the following data groups:
Identifier (ID) of coupon which user of client node 1b has already acquired and wishes to use
Electronic signature with respect to "identifier ID of coupon" prepared based on secret key associated with acquirer's public key described in acquisition request R1 registered (acquisition completed) on blockchain 5

Certification of Intent to Use Coupon by Coupon Acquirer

Subsequently, the use request verification unit 253' in the issuing node 2b verifies the validity of the use request R2 from the use request unit 155" by reference to the blockchain 5 (step S13', use request verification step).

Subsequently, in the case that the use authorization unit 254' in the issuing node 2b determines that the use request R2 is valid on the basis of the fact that the acquisition request R1 is registered on the blockchain 5, the use authorization unit 254' prepares a use authorization A1 to send the same to the user of the client node 1 and requests to register the use authorization A1 on the blockchain 5, thereby authorizing the use of the coupon (step S14', use authorization step).

Additionally, the use authorization A1 is a set of data made up of the following data groups:
Use request R2
Electronic signature of issuing node 2b (Certification of intent to authorize use of coupon by issuing node 2b)

In the case that the use authorization unit 254' determines that the use request R2 is not valid based on the reason that the acquisition request R1 is not registered on the blockchain 5, the use authorization unit 254' notifies the client node 1b that the use of the coupon is rejected.

Given that the miners on the blockchain 5 approves the use authorization A1 and that the use authorization A1 is registered on the blockchain 5 (step S15), the user of the client node 1b is allowed to use the coupon. Additionally, the user may be allowed to use the coupon at a time when the client node 1b receives the use authorization A1 before the use authorization A1 is registered on the blockchain 5.

Summary of this Embodiment

As described above, the information processing system 300 performs the registration of a coupon, the verification of the validity of a coupon acquisition request, and a use authorization for a coupon using the blockchain 5. This makes it possible to increase the transparence and fairness in a coupon providing service.

Further, the processing steps in steps S1 to S5 may be executed after the coupon is issued even in this embodiment. The issuing node 2b may request the blockchain 5 to register the coupon without involving the authentication node 3 instead of executing the processing steps in step S7 to S9. Additionally, the acquisition request unit 157 in the client node 1b may request to acquire the coupon by presenting the user data D yet to be authenticated to the blockchain 5 in step S12 while skipping the processing steps in steps S2 to S5.

Further, the terms of use Q1 may include the requirement that the user data D is presented to the issuing node 2b. In this case, the use request unit 155" in the client node 1b sends the user data D along with the use request R2 in step S12', thereby requesting to use the coupon. As such, it is possible to develop the information processing system 300 to serve as a platform for smart contracts that allows buying and selling user data by obliging the user who wishes to use a coupon to present the user data to a coupon issuer.

Fourth Embodiment

In a fourth embodiment, an aspect of replacing the role of an authentication node by a blockchain is described. Note that constituent elements that have functions identical to the constituent elements in the first, the second and the third embodiments are given the same reference numerals and a description of features that are identical to the first, the second and the third embodiments are omitted.

System Configuration

Figure 16:
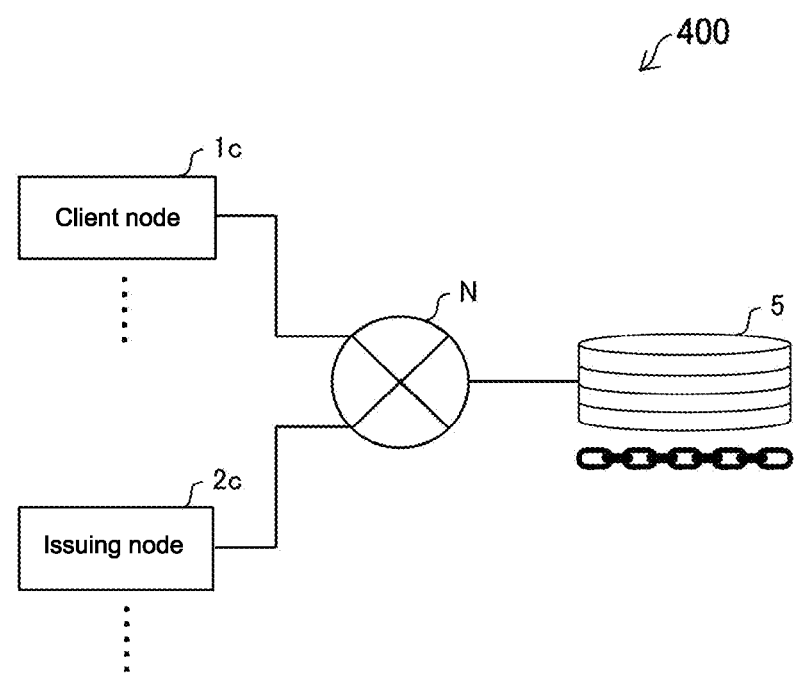
FIG. 16 schematically illustrates an information processing system according to a fourth embodiment.

FIG. 16 schematically illustrates an information processing system 400 according to a fourth embodiment. The information processing system 400 includes a client node 1c, an issuing node 2c, and a blockchain 5. The client node 1c, the issuing node 2c, and the blockchain 5 are connected to communicate with each other wired or wirelessly via a communication network N such as the internet.

The client node 1c is an information processing device managed by a user who uses digital coupons. The hardware configuration of the client node 1c is identical to the hardware configuration of the client node 1 according to the first embodiment.

The issuing node 2c is an information processing device which issues digital coupons having terms of use. The hardware configuration of the issuing node 2c is identical to the hardware configuration of the issuing node 2 according to the first embodiment.

Configuration of Each Node

Figure 17:
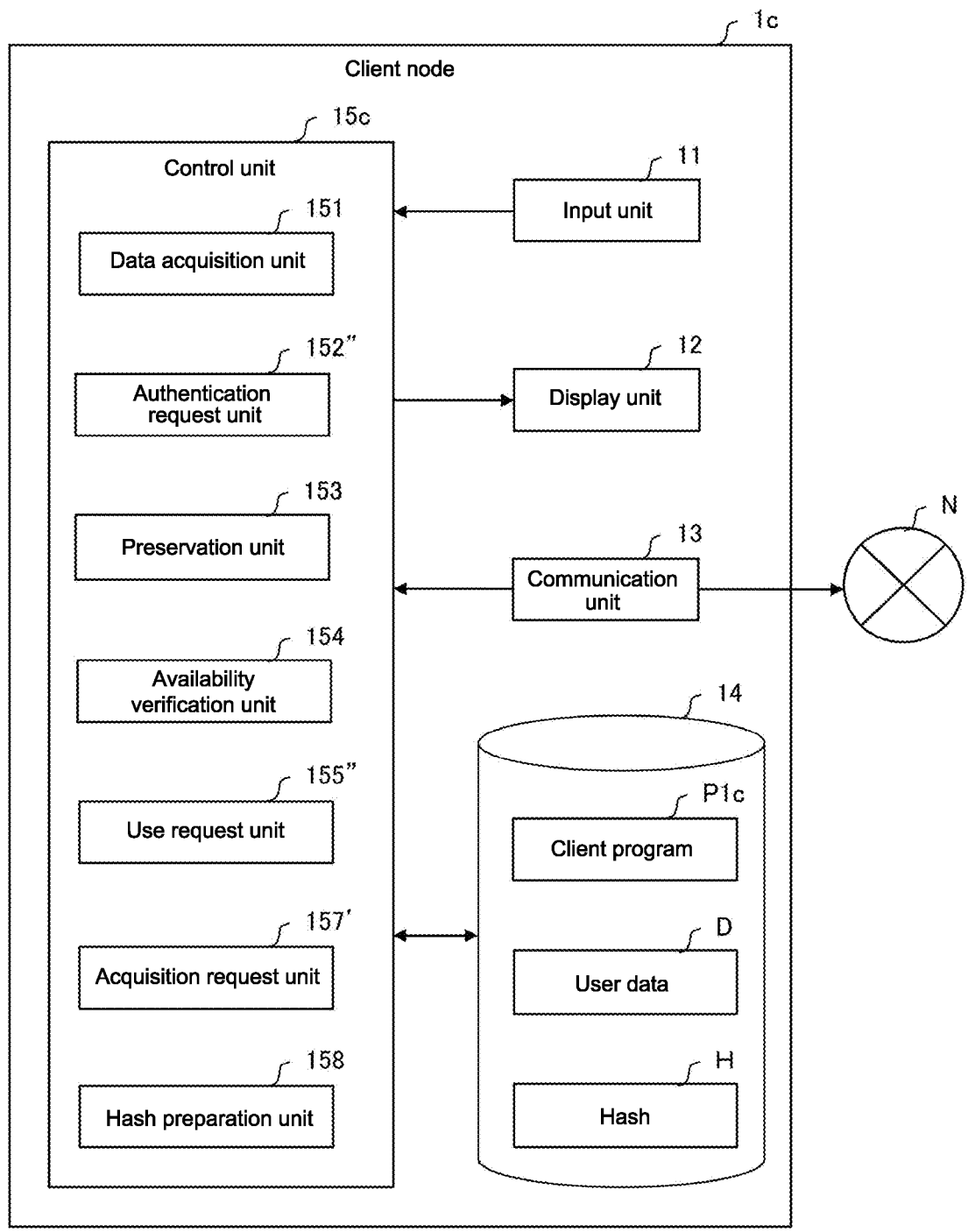
FIG. 17 is a functional block diagram illustrating the configuration of a client node according to the fourth embodiment.
Figure 18:
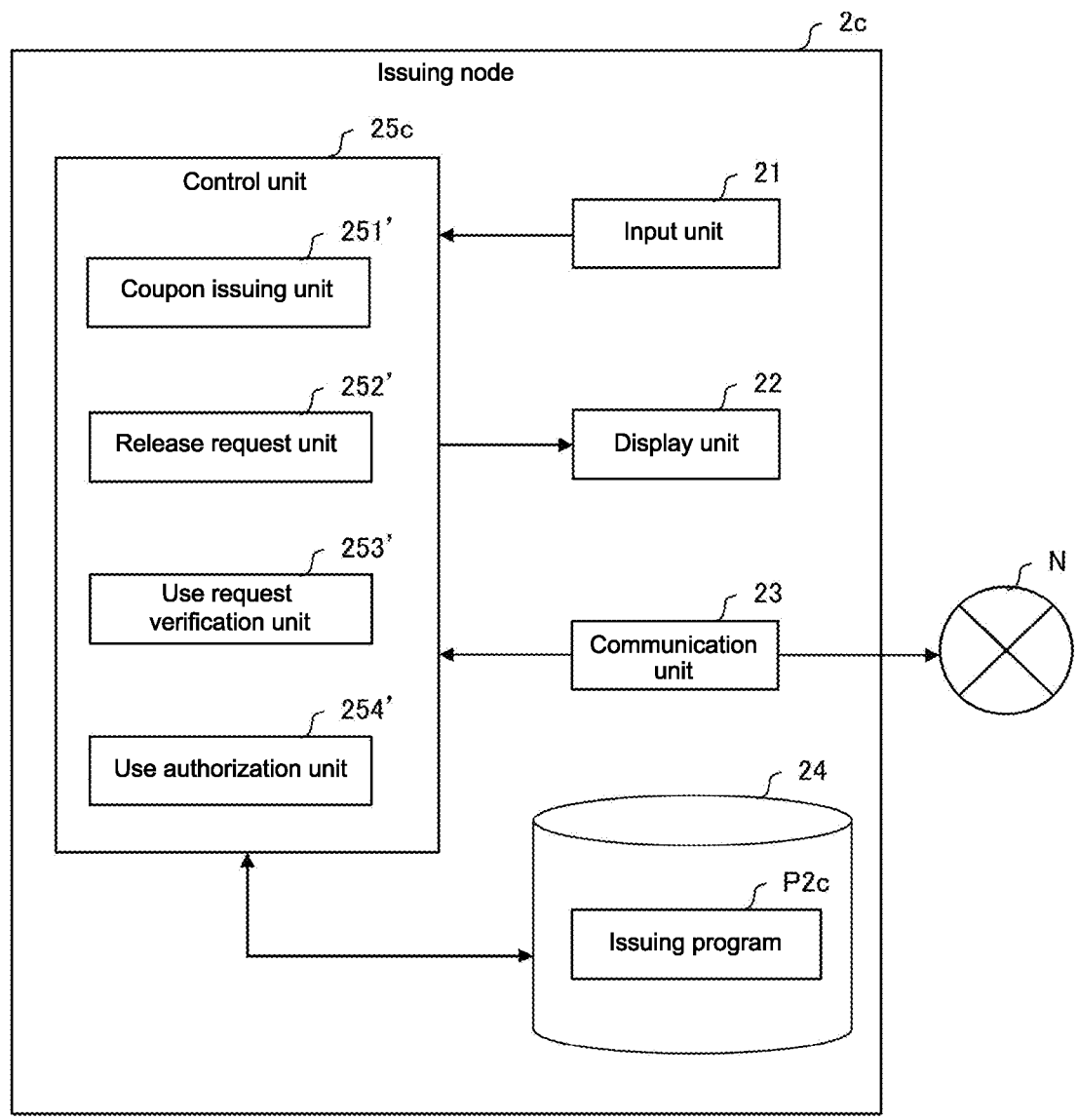
FIG. 18 is a functional block diagram illustrating the configuration of an issuing node according to the fourth embodiment.

FIG. 17 is a functional block diagram illustrating the configuration of the client node 1c; FIG. 18 is a functional block diagram illustrating the configuration of the issuing node 2c.

As shown in FIG. 17, the client node 1c includes an input unit 11, a display unit 12, a communication unit 13, a storage unit 14, and a control unit 15c. That is, the client node 1c has a configuration in which the control unit 15 is replaced by the control unit 15c in the client node 1 shown in FIG. 2.

A client program P1c according to this embodiment is stored in the storage unit 14.

The control unit 15c is represented as a functional block whose functions are performed by an arithmetic processing unit such as a CPU or a MPU included in the client node 1c, which reads the client program. P1c stored in the storage unit 14 to a main storage device such as a RAM to thus execute the client program P1c. The control unit 15c includes a data acquisition unit 151, an authentication request unit 152", a preservation unit 153, an availability verification unit 154, a use request unit 155", an acquisition request unit 157', and a hash preparation unit 158. That is, the control unit 15c has a configuration in which the authentication request unit 152 and the use request unit 155 are replaced by the authentication request unit 152" and the use request unit 155" respectively and the acquisition request unit 157' and the hash preparation unit 158 are further provided in the control unit 15 shown in FIG. 2. The functions of these units are described later.

As shown in FIG. 18, the issuing node 2c includes an input unit 21, a display unit 22, a communication unit 23, and a storage unit 24, and a control unit 25c. That is, the issuing node 2c has a configuration in which the control unit 25 is replaced by the control unit 25c in the issuing node 2 shown in FIG. 3.

The issuing program P2c according to this embodiment is stored in the storage unit 24.

The control unit 25c is represented as a functional block whose functions are performed by an arithmetic processing unit such as a CPU or a MPU included in the issuing node 2c, which reads the issuing program P2c stored in the storage unit 24 to a main storage device such as a RAM to thus execute the issuing program P2c. The control unit 25c includes a coupon issuing unit 251', a release request unit 252', a use request verification unit 253', and a use authorization unit 254'. That is, the control unit 25c has a configuration in which the release request unit 252 is replaced by the release request unit 252' in the control unit 25b shown in FIG. 13. The functions of these units are described later.

Processing Sequence

Figure 19:
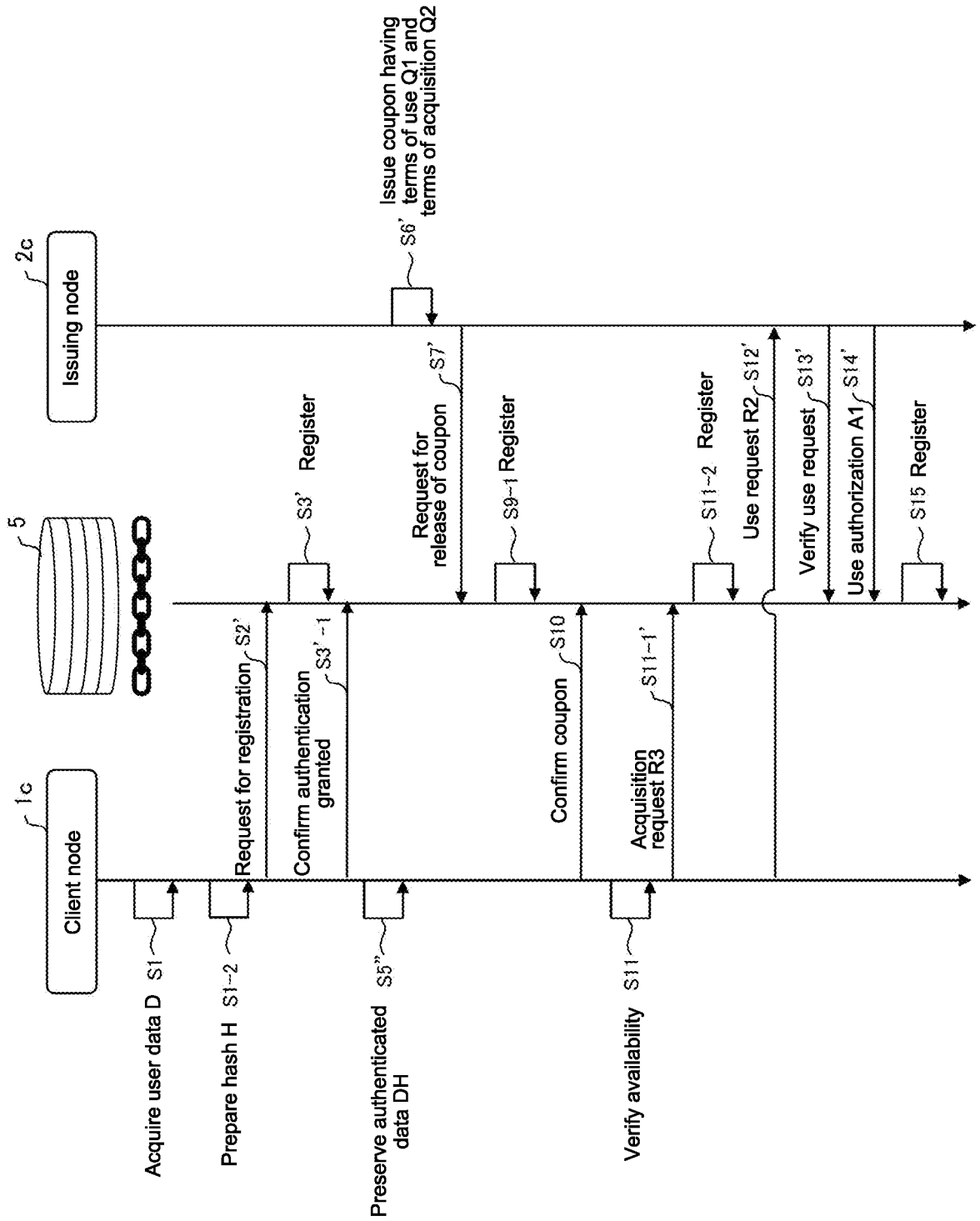
FIG. 19 is a sequence chart illustrating the processing steps of a coupon providing method in the information processing system according to the fourth embodiment.

FIG. 19 is a sequence chart illustrating the processing steps of a service data providing method according to this embodiment in the information processing system 400. The communication mode in each processing step is not particularly limited. Note that processing steps identical to the processing steps in the service data providing method according to the first to third embodiments are given the same reference numerals.

According to this embodiment, the main processing steps in FIG. 19 are executed by the control unit. 15c in the client node 1c and the control unit 25c in the issuing node 2c respectively illustrated in FIGS. 17 and 18. Additionally, a user may manually execute a part of the processing steps in FIG. 19 via the input unit 11 in the client node 1c, or the input unit 21 in the issuing node 2c.

First, in the client node 1c, the data acquisition unit 151 acquires user data D by preparing the user data D in the client node 1c or by downloading the user data D prepared by an external device into the client node is (step S1: data acquisition step). Subsequently, the hash preparation unit 158 prepares a hash H that is the hash of the user data D (step S1-2).

Subsequently, the authentication request unit 152" in the client node 1c requests to register the hash H on the blockchain 5 in order to acquire authentication for the validity of the user data D (step S2", authentication request step). If the hash H is approved by miners and registered on the blockchain 5 (step S3'), authentication completes to allow the client node 1c to confirm the completion of authentication. (step S3'-1).

Thereafter, the preservation unit 153 in the client node 1c preserves authenticated user data DH made up of the user data D and the hash H in the storage unit 14 (step S5"). Hereinafter, the authenticated user data DH is simply referred to as "data DH".

Then, the coupon issuing unit 251' in the issuing node 2c issues a coupon having terms of use Q1 and terms of acquisition Q2 in accordance with user's operation or the like (step S6'). Subsequently, the releasing unit 252' requests to register the coupon on the blockchain 5 in order to release the issued coupon (step S7'). If the coupon is approved by miners and registered on the blockchain 5 (step S9-1), the coupon is released so that the user of the client node 1*c* can confirm the issuance of the coupon (step S10).

In the case that a coupon which the user of the client node 1*c* wishes to use is present in available coupons, the acquisition request unit 157' requests to register an acquisition request R3 for the coupon on the blockchain 5 in accordance with user's operation. (step S11-1', acquisition request step). The acquisition request R3 is a set of the following data groups:

Identifier (ID) of coupon already registered on blockchain 5 which user wishes to acquire
Hash H or user data D
Public key of acquirer
Evidence of satisfying terms of acquisition Q2 (for example, data DH determined as terms of acquisition)

The public key of an acquirer can be the same as the public key of the user. Further, in order to increase the anonymity of the user, the public key of the acquirer may be changed at every time of use instead of using the same public key over and over again.

The miners on the blockchain 5 verifies whether or not the information included in the acquisition request R3 satisfies the terms of acquisition Q2. If the miners determined that the acquisition request R3 is valid, the miners register the acquisition request R3 on the blockchain (step S11-2). The data DH may be eliminated from the acquisition request R3 in order to increase the anonymity of the user. Here, the terms for the miners to determine that the acquisition request R3 is valid, is "it can be verified that the user data D is present within a prescribed period of time (normally in the past)." According to this embodiment, the hash H of the user data D is registered on the blockchain 5 in step S3'. Therefore, the miners can verify whether or not the above-described terms are satisfied by calculating the hash H' by themselves from the user data D included in the terms of acquisition R3 to examine whether or not the hash information identical to the hash H' is included in a specific block in the blockchain 5.

Additionally, in step S11-1', the acquisition request unit 157' may request to register the acquisition request R3 on the blockchain 5 by including in the acquisition request R3 for the coupon only the user data D from which the hash H is removed as evidence of satisfying the terms of acquisition Q2. When the acquisition request R3 is registered on blockchain 5, acquisition of the coupon is completed.

Each of the following processing steps in steps S12' to S15 is identical to each step illustrated in FIG. 15. The user of the client node 1*c* is allowed to use the coupon through these processing steps. Also in this embodiment, the user of the client node 1*c* may be allowed to use the coupon at a time when the client node 1*c* receives the use authorization A1 before the use authorization A1 is registered on the blockchain 5 in step S15.

Summary of this Embodiment

As described above, the information processing system 400 performs the validity authentication of user data, the registration of a coupon, the validity verification of a coupon acquisition request, and a use authorization for the coupon using the blockchain 5. That is, in this embodiment, the system uses the blockchain 5 to perform the processing steps that were performed by the authentication node 3*b* in the information processing system 300 according to the third embodiment. Thus, this embodiment can make a greater increase in transparence and fairness than the third embodiment.

Further, the processing steps in steps S1 to S5" may be executed after the coupon is issued also in this embodiment. The acquisition request unit 157' in the client node 1*c* may request to acquire the coupon by presenting the user data D yet to be authenticated to the blockchain 5 in steps S11-1' while skipping the processing steps in steps S1-2 to S5".

Fifth Embodiment

In the fourth embodiment described above, there also are problems that a transfer of the role of an authentication node (the role of a service provider) to a blockchain decreases the governance and earning power of the service provider, thereby making it more difficult to implement appropriate measures against fraud (prevention of fraud coupons, prevention of unfair decision when a privilege is not granted and so forth). In a fifth embodiment, an aspect of addressing these problems by using an authentication node is described. Note that constituent elements that have functions identical to the constituent elements in the first to fourth embodiments are given the same reference numerals and a description of features that are identical to the first to fourth embodiments are omitted.

System Configuration

Figure 20:
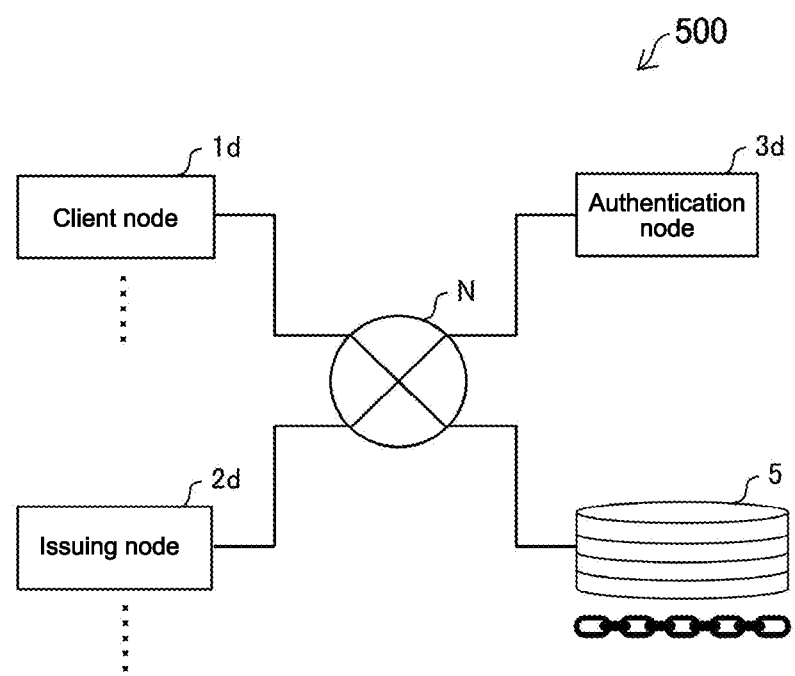
FIG. 20 schematically illustrates an information processing system according to a fifth embodiment.

FIG. 20 schematically illustrates an information processing system 500 according to a fifth embodiment. The information processing system 500 includes a client node 1*d*, an issuing node 2*d*, an authentication node 3*d* and a blockchain 5. The client node 1*d*, the issuing node 2*d*, the authentication node 3*d* and the blockchain 5 are connected to communicate with each other wired or wirelessly via a communication network N such as the internet.

The client node 1*d* is an information processing device managed by a user who uses digital coupons. The hardware configuration of the client node 1*d* is identical to the hardware configuration of the client node 1 according to the first embodiment.

The issuing node 2*d* is an information processing device managed by a business operator or the like who issues digital coupons. The hardware configuration of the issuing node 2*d* is identical to the hardware configuration of the issuing node 2 according to the first embodiment.

The authentication node 3*d* is an information processing device managed by a service provider that performs coupon providing service. The hardware configuration of the authentication node 3*d* is identical to the hardware configuration of the authentication node 3 according to the first embodiment.

Configuration of Each Node

Figure 21:
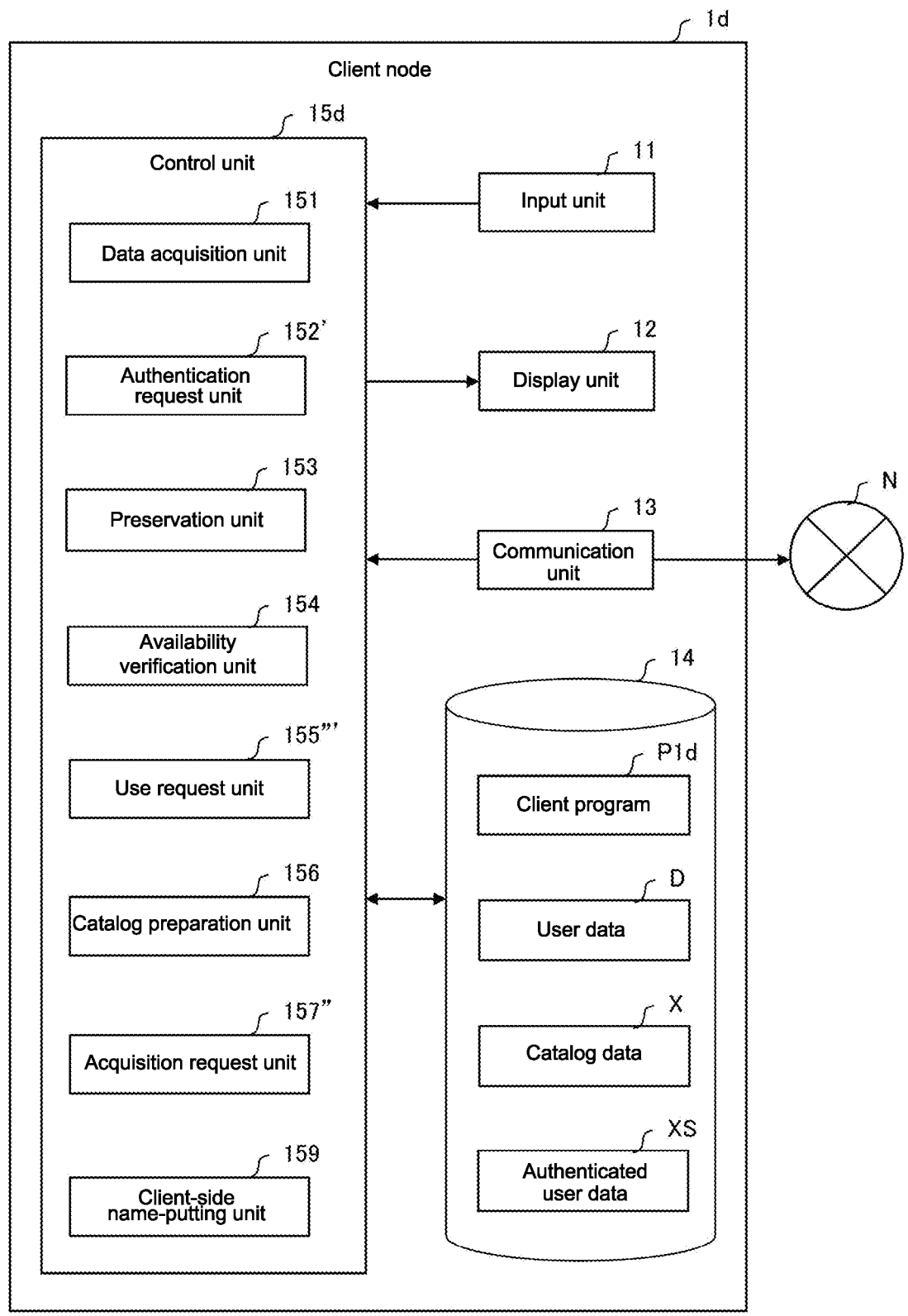
FIG. 21 is a functional block diagram illustrating the configuration of a client node according to the fifth embodiment.
Figure 22:
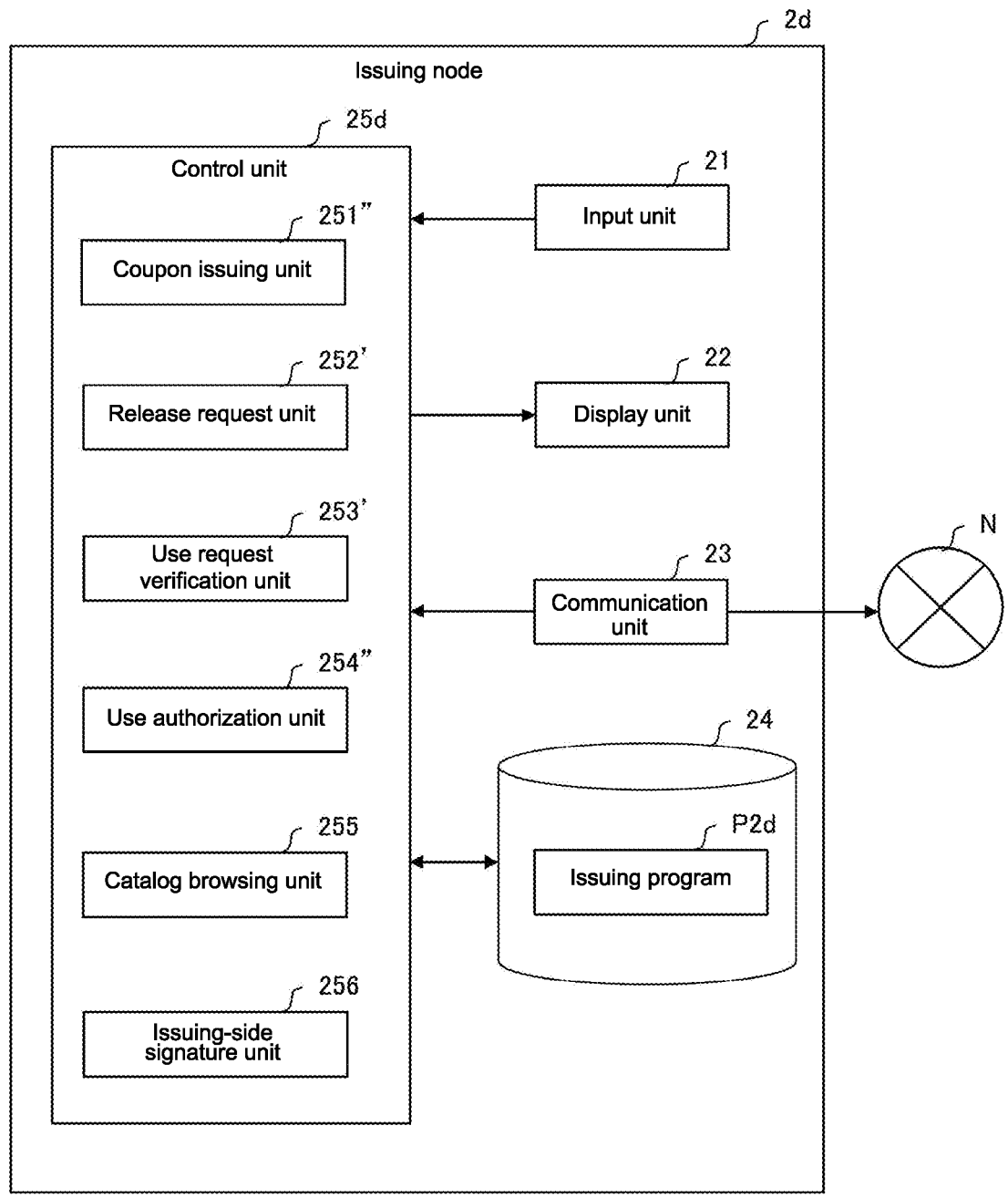
FIG. 22 is a functional block diagram illustrating the configuration of an issuing node according to the fifth embodiment.
Figure 23:
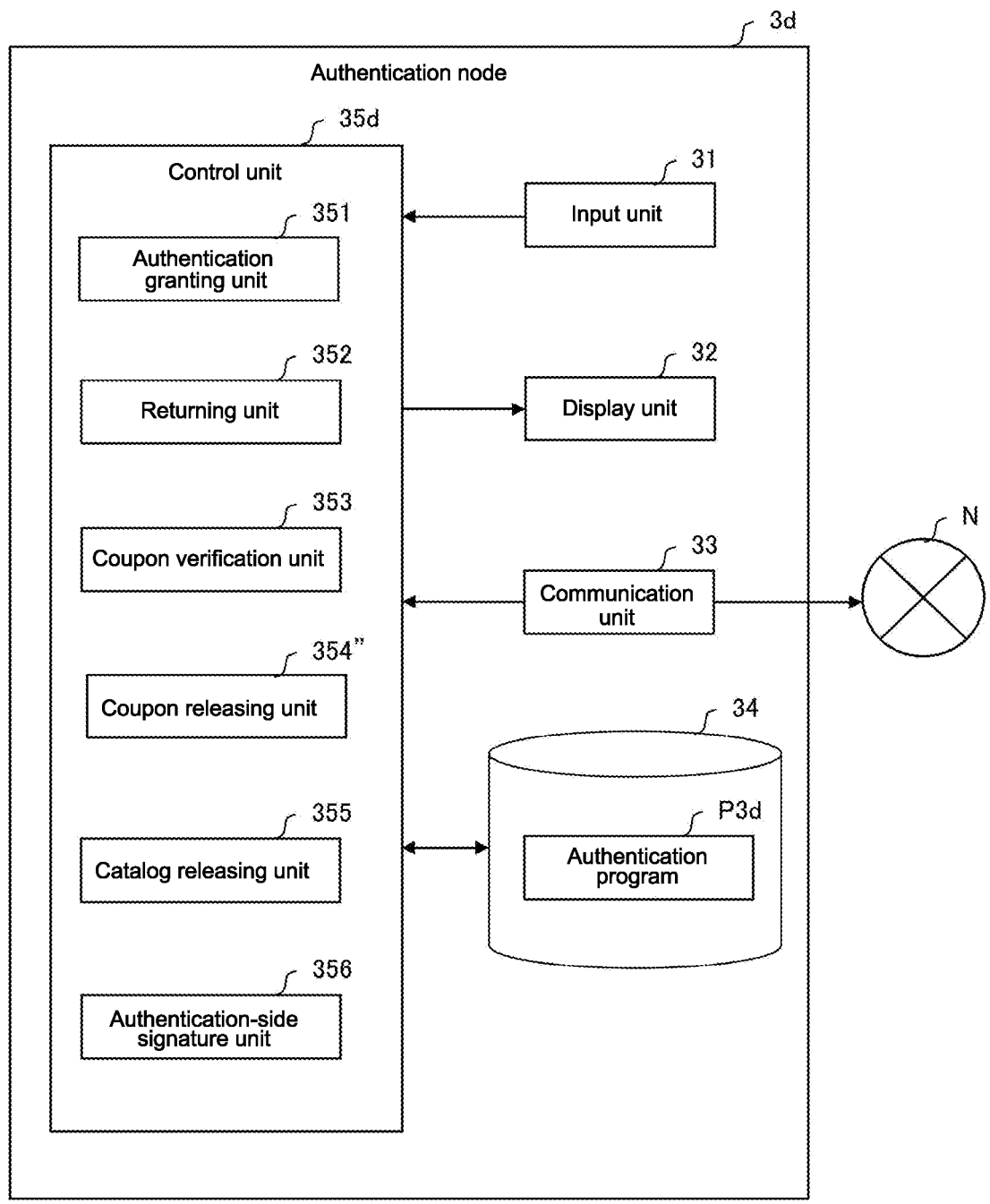
FIG. 23 is a functional block diagram illustrating the configuration of an authentication node according to the fifth embodiment.

FIG. 21 is a functional block diagram illustrating the configuration of the client node 1*d*; FIG. 22 is a functional block diagram illustrating the configuration of the issuing node 2*d*, and FIG. 23 is a functional block diagram illustrating the configuration of the authentication node 3*d*.

As shown in FIG. 21, the client node 1*d* includes an input unit 11, a display unit 12, a communication unit 13, a storage unit 14, and a control unit 15*d*. That is, the client node 1*d* has a configuration in which the control unit 15 is replaced by the control unit 15*d* in the client node 1 shown in FIG. 2.

A client program P1d according to this embodiment is stored in the storage unit 14.

The control unit 15d is represented as a functional block whose functions are performed by an arithmetic processing unit such as a CPU or a MPU included in the client node 1d, which reads the client program P1d stored in the storage unit 14 to a main storage device such as a RAM to thus execute the client program P1d. The control unit 15d includes a data acquisition unit 151, an authentication request unit 152', a preservation unit 153, an availability verification unit 154, a use request unit 155''', a catalog preparation unit 156, an acquisition request unit 157'', and a client-side name-putting unit 159. That is, the control unit 15d has a configuration in which the authentication request unit 152 and the use request unit 155 are replaced by the authentication request unit 152' and the use request unit 155''' respectively, and the catalog preparation unit 156, the acquisition request unit 157'' and the client-side name-putting unit 159 are further provided in the control unit 15 shown in FIG. 2. The functions of these units are described later.

As shown in FIG. 22, the issuing node 2d includes an input unit 21, a display unit 22, a communication unit 23, and a storage unit 24, and a control unit 25d. That is, the issuing node 2d has a configuration in which the control unit 25 is replaced by the control unit 25d in the issuing node 2 shown in FIG. 3.

The issuing program P2d according to this embodiment is stored in the storage unit 24.

The control unit 25d is represented as a functional block whose functions are performed by an arithmetic processing unit such as a CPU or a MPU included in the issuing node 2d, which reads the issuing program P2d stored in the storage unit 24 to a main storage device such as a RAM to thus execute the issuing program P2d. The control unit 25d includes a coupon issuing unit 251'', a release request unit 252', a use request verification unit 253', and a use authorization unit 254'', a catalog browsing unit 255, and an issuing-side signature unit 256. That is, the control unit 25d has a configuration in which the coupon issuing unit 251, the release request unit 252, the use request verification unit 253, and the use authorization unit 254 are replaced by the coupon issuing unit 251'', the release request unit 252', the use request verification unit 253', and the use authorization unit 254'' respectively, and the catalog browsing unit 255 and the issuing-side signature unit 256 are further provided in the control unit 25 shown in FIG. 3. The functions of these units are described later.

As shown in FIG. 23, the authentication node 3d includes an input unit 31, a display unit 32, a communication unit 33, a storage unit 34, and a control unit 35d. That is, the authentication node 3d has a configuration in which the control unit 35 is replaced by the control unit 35d in the authentication node 3 shown in FIG. 4.

The authentication program P3d according to this embodiment is stored in the storage unit 34.

The control unit 35d is represented as a functional block whose functions are performed by an arithmetic processing unit such as a CPU or a MPU included in the authentication node 3d, which reads the authentication program P3d stored in the storage unit 34 to a main storage device such as a RAM to thus execute the authentication program P3d. The control unit 35d includes an authentication granting unit 351, a returning unit 352, a coupon verification unit 353, a coupon releasing unit 354'', a catalog releasing unit 355, and an authentication-side signature unit 356. That is, the control unit 35d has a configuration in which the coupon releasing unit 354 is replaced by the coupon releasing unit 354'' and the catalog releasing unit 355 and the authentication-side signature unit 356 are further provided in the control unit 35 shown in FIG. 4. The functions of these units are described later.

Processing Sequence

Figure 24:
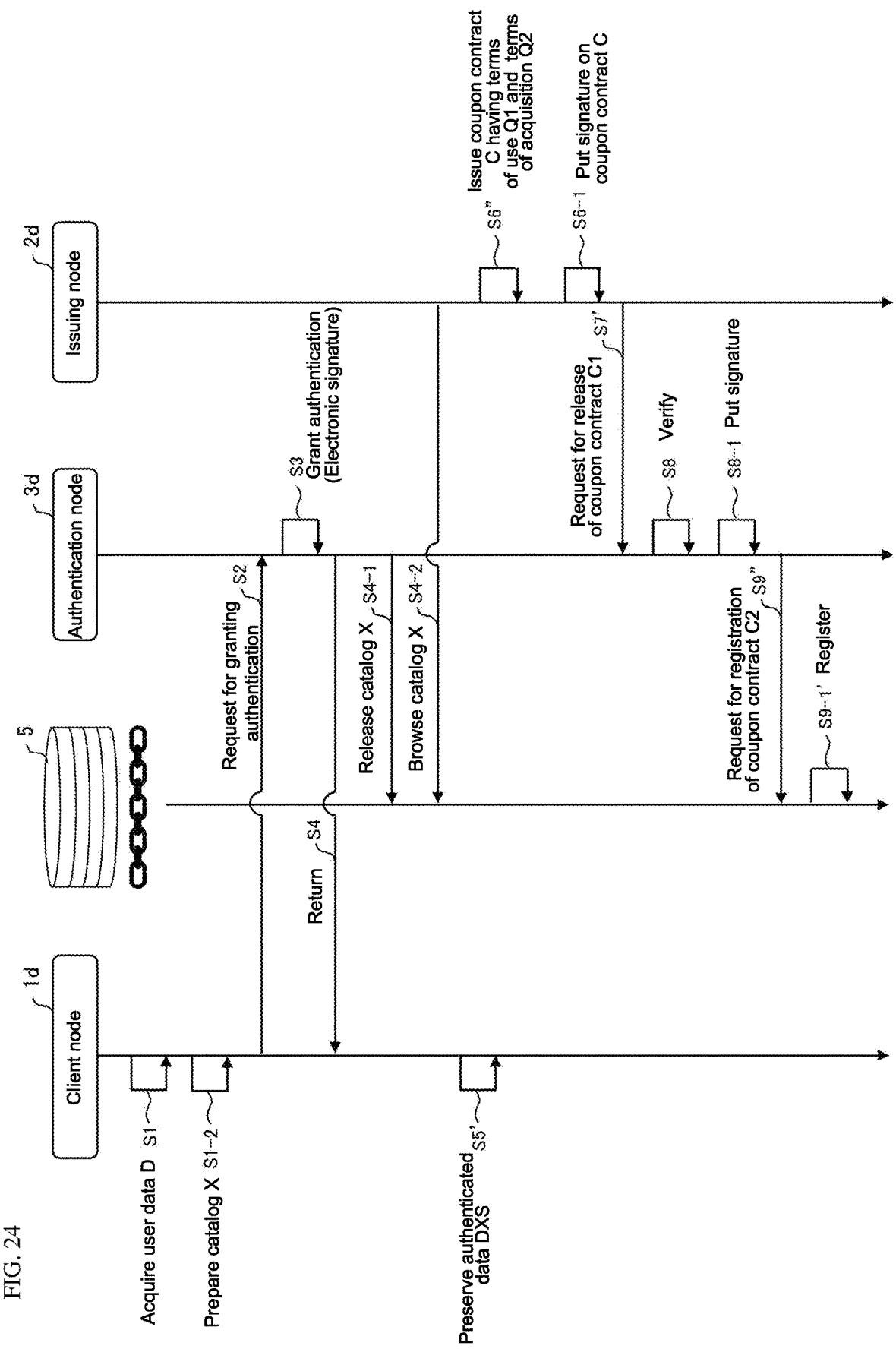
FIG. 24 is a sequence chart illustrating the processing steps of a coupon providing method in the information processing system according to the fifth embodiment.
Figure 25:
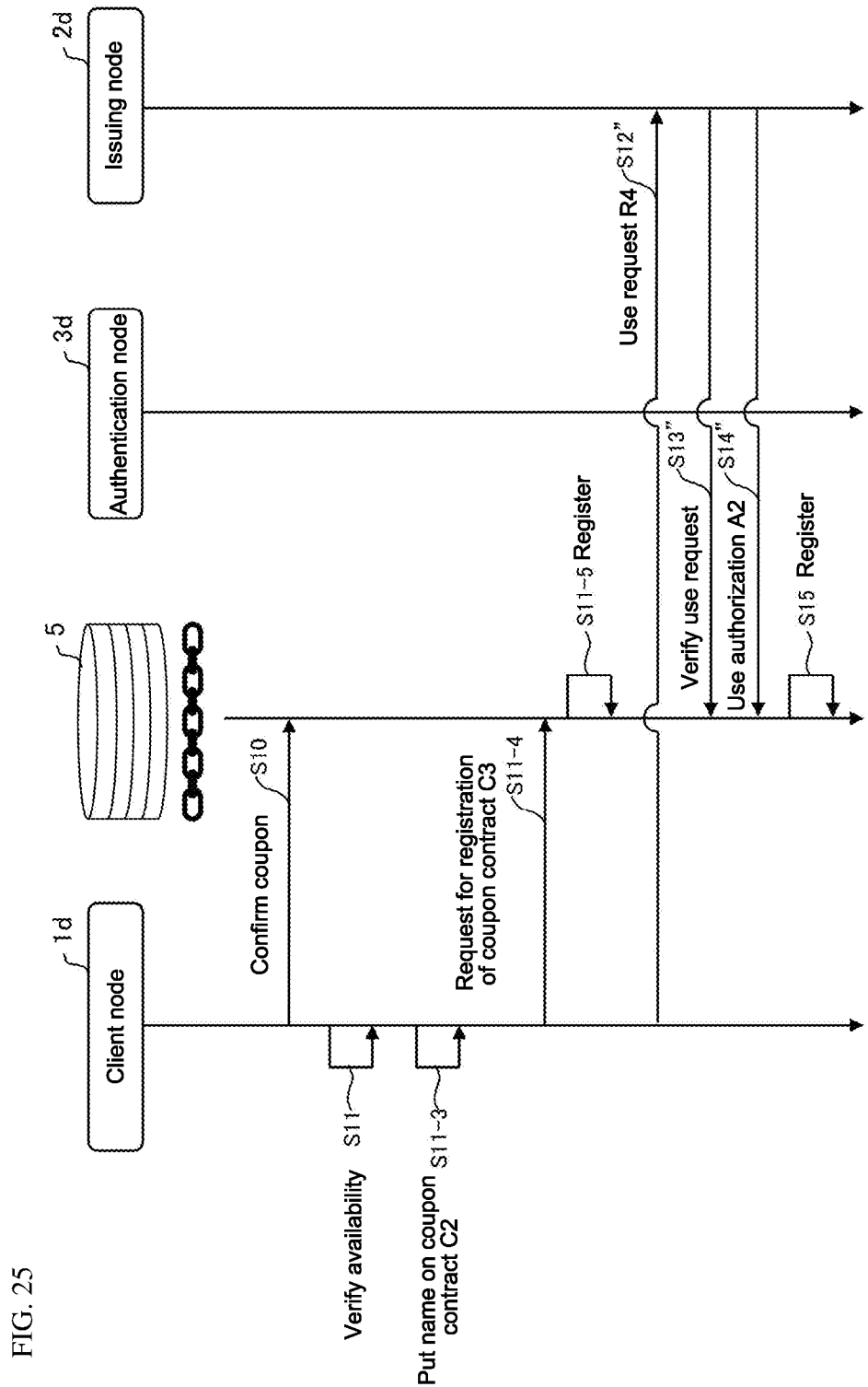
FIG. 25 is a sequence chart illustrating the processing steps of a coupon providing method in the information processing system according to the fifth embodiment.

FIGS. 24 and 25 are sequence charts illustrating the processing steps of a service data providing method according to this embodiment in the information processing system 500. The communication mode in each processing step is not particularly limited. Note that processing steps identical to the processing steps in the service data providing method according to the first to fourth embodiments are given the same reference numerals.

According to this embodiment, the main processing steps in FIGS. 24 and 25 are executed by the control unit 15d in the client node 1d, the control unit 25d in the issuing node 2d, and the control unit 35d in the authentication node 3d respectively illustrated in FIGS. 21 to 23. Additionally, a user may manually execute a part of the processing steps in FIGS. 24 and 25 via the input unit 11 in the client node 1d, the input unit 21 in the issuing node 2d, the input unit 31 in the authentication node 3d.

First steps of steps S1 to S5' are identical to those in the second embodiment shown in FIG. 10. In step S6'', the coupon issuing unit 251'' in the issuing node 2d issues a coupon having the terms of use Q1 and terms of acquisition Q2 as a coupon contract C in accordance with user's operation or the like. The terms of acquisition. Q2 can be the same as the terms of use Q1. The coupon contract C is a set of data including the following data groups:

Coupon responsible issuer (company) name
Coupon benefits
Coupon terms of use (terms of acquisition)

The benefits of acquiring a coupon includes, for example, allowing a coupon holder to buy specific goods at half the price, at a specific location, and at a specific time and date. Coupon terms of use (terms of acquisition) may include the following conditions:

Holding authenticated user data D
Capability of presenting user data D to coupon issuer
Payment of fixed amount of virtual currency
Completion of issuance until predetermined issuance due date
Number of acquired coupons and used coupons yet to reach upper limit Next, the issuing-side signature unit 256 in the issuing node 2d put signature on the coupon contract C (step S6-1). The coupon contract whereon the issuing-side signature unit 256 put a signature is defined as a coupon contract C1.

Subsequently, the release request unit 252' in the issuing node 2d requests to the authentication node 3d to release the coupon contract C1 (step S7'). Upon this request, the coupon verification unit 353 in the authentication node 3d verifies the content of the coupon (step S8), and the authentication-side signature unit 356 put signature on the coupon contract C1 unless the content of the coupon is contrary to public order, morality or the like (step S8-1). A coupon contract whereon the authentication-side signature unit 356 put a signature is defined as a coupon contract Q2.

Next, the coupon releasing unit 354'' requests to register the coupon contract C2 on the blockchain 5 in order to release the coupon (step S9''). If the coupon is approved by miners and registered on the blockchain 5 (step S9-1'), then the coupon contract C2 is released so that the user of the client node 1d can confirm the issuance of the coupon (step S10). The users of the issuing node 2d and the authentication node 3d as well can confirm that the coupon contract C2 is registered on the blockchain 5.

In step S11, the availability verification unit 154 in the client node 1d verifies whether or not data that satisfies the terms of use Q1 for the released coupon contract C2 is present in the data XS and the user data D stored in the storage unit 14. In the case that a coupon which the user of the client node 1d wishes to use is present in available coupon contracts C2, the client-side name-putting unit 159 puts a name on the coupon contract C2 (put the public key of an acquirer) in accordance with user's operation (step S11-3). The coupon contract whereon the client-side name-putting unit 159 put the public key of an acquirer is defined as a coupon contract C3. Additionally, the public key of an acquirer can be the same as the public key of the user. Further, in order to increase the anonymity of the user, the public key of the acquirer may be changed at every time of use instead of using the same public key over and over again.

Further, the acquisition request unit 157" requests to register the coupon contract C3 on the blockchain 5 by presenting either one or both of the data XS and the user data D to the blockchain 5 as evidence data in order to acquire the coupon (step S11-4). Miners on the blockchain 5 verifies whether or not the information included in the presented evidence data satisfies the terms of acquisition Q2. If it is determined that the information satisfies the terms of acquisition Q2, the miners registers a set of the coupon contract C3 and the evidence data or only the coupon contract C3 on the blockchain 5 (step S11-5). This completes the acquisition of the coupon. The users of the issuing node 2d and the authentication node 3d as well can confirm that the coupon contract C3 is registered on the blockchain 5.

Subsequently, in order that the user of the client node 1d uses the coupon, the use request unit 155''' in the client node 1d presents a use request R4 corresponding to the coupon contract C3 registered on the blockchain 5 to the issuing node 2d, thereby requesting to use the coupon (step S12"). More specifically, the use request R4 is a set of data consisting of, for example, the following data groups:
Identifier (ID) of coupon which user of client node 1d has already acquired and wishes to use
Electronic signature with respect to "identifier ID of coupon" prepared based on secret key associated with acquirer's public key described in coupon contract C3 registered (acquisition completed) on blockchain 5

Certification of Intent to Use Coupon by Coupon Acquirer

Subsequently, the use request verification unit 253' in the issuing node 2d verifies the validity of the use request R4 from the use request unit 155''' by reference to the blockchain 5 (step S13", use request verification step).

Subsequently, in the case that the use authorization unit 254" in the issuing node 2d determines that the use request R4 is valid on the basis of the fact that the coupon contract C3 is registered on the blockchain 5, and the verification of an electronic signature with respect to "the identifier ID of the coupon" prepared by a secret key associated with the public key of an acquirer described in the coupon contract C3, the use authorization unit 254" prepares a use authorization A2 to send the same to the user of the client node 1d and requests to register the use authorization A2 on the blockchain 5, thereby authorizing the use of the coupon (step S14", use authorization step).

Additionally, the use authorization A2 is a set of data made up of the following data groups:
Use request R4
Electronic signature of issuing node 2d (Certification of intent to use coupon by issuing node 2d)

In the case that the use authorization unit 254" determines that the use request R4 is not valid based on the reason that the coupon contract C3 is not registered on the blockchain 5, the use authorization unit 254" notifies the client node 1d that the use of the coupon is rejected.

Given that the miners on the blockchain 5 approves the use authorization A2 and that the use authorization A2 is registered on the blockchain 5 (step S15), the user of the client node 1d is allowed to use the coupon. Additionally, also in this embodiment, the user may be allowed to use the coupon at a time when the client node 1d receives the use authorization A2 before the use authorization A2 is registered on the blockchain 5 in step S15.

Summary of this Embodiment

As described above, the information processing system 500 allows a coupon to be issued in the form of a contract, and whereon signatures are put in the issuing node 2d and the authentication node 3d. This will help to prevent a fraud coupon from being issued. Further, the authentication node 3d (service provider) performs authentication for the user data or the catalog data in addition to putting signature onto a coupon contract, thereby facilitating the increase of governance and earning power of the service provider.

Further, the processing steps in steps S1 to S5" may be executed after the coupon is issued also in this embodiment. The steps S1 to S5" may be replaced by steps S1 to S5 shown in FIG. 5 or by steps S1 to S5'" shown in FIG. 19. Alternatively, the acquisition request unit 157" may request to acquire the coupon by presenting the user data D yet to be authenticated to the blockchain 5 in step S11-4 while skipping the processing steps in steps S1-2 to S5.

Additionally, the registration of the coupon contract C2 on the blockchain 5 (step S9-1') is not necessarily required, and for example, a service provider who manages the authentication node 3d may release the coupon contract C2 by uploading the coupon contract C2 to the public server or the like. Also in this case, the validity of the coupon is verified at a time when the acquisition request unit 157" requests to register the coupon contract C3 on the blockchain 5 (step S11-4).

Further, although the governance of a service provider would decrease, signature to be put on the coupon contract C1 in the authentication node 3d (step S8-1) may be omitted. In this case, the issuing node 2d may request to register the coupon contract C1 directly to the blockchain 5.

Supplementary Information

Although the present invention is described according to five embodiments, the invention is not limited to these embodiments. It goes without saying that various modifications and variations are possible without departing from the scope of the invention. For example, any aspects created by appropriately combining technical means disclosed in each embodiment belong to the scope of the present invention.

Although each of the above-described embodiments discloses a platform in which an information processing system adopts blockchain technology, the present invention is not limited to this, and may be a typical client/server system. In this case, an acquisition request and a coupon contract are registered on a database provided on a server or the like (for example, third-party bulletin boards, web services implemented by service providers) instead of blockchain.

Additionally, although each of the above-described embodiments describes an aspect of providing a digital coupon as service data, the present invention is not limited to this aspect, and the service data can include any services electronically provided to the user of a client node such as content data of video images or the like, a serial code associated with various types of service usage right or electronic money, virtual currency, or the like.

DESCRIPTION OF REFERENCE NUMERALS

1 Client node
1a Client node
1b Client node
1c Client node
1d Client node
2 Issuing node
2a Issuing node
2b Issuing node
2c Issuing node
2d Issuing node
3 Authentication node
3a Authentication node
3b Authentication node
3c Authentication node
3d Authentication node
4 Public Server
5 Blockchain
11 Input unit
12 Display unit
13 Communication unit
14 Storage unit
15 Control unit
15a Control unit
15b Control unit
15c Control unit
15d Control unit
151 Data acquisition unit
152 Authentication request unit
152' Authentication request unit
152" Authentication request unit
153 Preservation unit
154 Availability verification unit
155 Use request unit
155' Use request unit
155" Use request unit
155'" Use request unit
156 Catalog preparation unit
157 Acquisition request unit
157' Acquisition request unit
157" Acquisition request unit
158 Hash preparation unit
159 Client-side name-putting unit
21 Input unit
22 Display unit
23 Communication unit
24 Storage unit
25 Control unit
25a Control unit
25b Control unit
25c Control unit
25d Control unit
251 Coupon issuing unit
251' Coupon issuing unit
251" Coupon issuing unit
252 Release request unit
252' Release request unit
253 Use request verification unit
253' Use request verification unit
254 Use authorization unit
254' Use authorization unit
254" Use authorization unit
255 Catalog browsing unit
256 Issuing-side signature unit
31 Input unit
32 Display unit
33 Communication unit
34 Storage unit
35 Control unit
35a Control unit
35b Control unit
35d Control unit
351 Authentication granting unit
352 Returning unit
353 Coupon verification unit
354 Coupon releasing unit
354' Coupon releasing unit
354" Coupon releasing unit
355 Catalog releasing unit
356 Authentication-side signature unit
100 Information processing system
200 Information processing system
300 Information processing system
400 Information processing system
500 Information processing system
A1 Use authorization
A2 Use authorization
C Coupon contract
C1 Coupon contract
C2 Coupon contract
C3 Coupon contract
D User data
DH Authenticated user data
DS Authenticated user data
H Hash
N Communication network
Q1 Terms of use
Q2 Terms of acquisition
R Use request
R' Use request
R1 Acquisition request
R2 Use request
R3 Acquisition request
R4 Use request
S Electronic signature
X Catalog data
XS Authenticated catalog data

The invention claimed is:

1. An information processing system comprising a client node, an issuing node for issuing service data having terms of use, and an authentication node including an authentication granting unit, wherein the client node includes:
a catalog preparation unit for preparing catalog data that anonymizes user data held by a user of the client node; and
an authentication request unit that requests to the authentication node to grant authentication for validity of the catalog data, wherein the authentication granting unit is configured to grant authentication for validity of the catalog data upon the request from the authentication request unit;

the client node further includes a use request unit that requests to use the service data by presenting authenticated catalog data authenticated by the authentication granting unit; and the issuing node includes:

a use request verification unit for verifying whether information included in the user data as provided in the authenticated catalog data satisfies the terms of use upon the use request from the use request unit; and a use authorization unit that authorizes the client node to use the service data when the information satisfies the terms of use.

2. The information processing system according to claim 1, further comprising a database, wherein the service data further includes terms of acquisition;

the issuing node further includes a release request unit that requests to register the service data on the database in order to release the service data;

the client node further includes an acquisition request unit that requests to register an acquisition request for the service data on the database by presenting the user data to the database;

the use request unit requests to use the service data by presenting a use request corresponding to the acquisition request registered on the database instead of the user data; and the use authorization unit authorizes the use of the service data by requesting to register the use request on the database.

3. The information processing system according to claim 2, wherein the acquisition request unit requests to register the acquisition request on the database by presenting authenticated catalog data authenticated by the authentication granting unit.

4. The information processing system according to claim 2, wherein the database is a blockchain.

5. The information processing system according to claim 1, further comprising a database, wherein the service data further includes terms of acquisition;

the issuing node includes an issuing-side signature unit that issues the service data as a contract and puts a signature on the contract;

the client node further includes a client-side name-putting unit for putting a name on the contract whereon the issuing-side signature unit put the signature, and an acquisition request unit for requesting to register the contract on the database, the contract bearing the name put by the client-side name-putting unit, by presenting the user data to the database in order to acquire the service data;

the use request unit requests to use the service data by presenting a use request corresponding to the contract registered on the database to the issuing node instead of the user data; and the use authorization unit authorizes the use of the service data by requesting to register the use request on the database.

6. The information processing system according to claim 5, wherein the authentication node includes an authentication-side signature unit that puts a signature on the contract whereon the issuing-side signature unit put the signature; and the client-side name-putting unit puts a name on the contract whereon the issuing-side signature unit and the authentication-side signature unit put the signatures respectively.

7. The information processing system according to claim 6, wherein the acquisition request unit requests to register the contract on the database, the contract bearing the name put by the client-side name-putting unit, by presenting the authenticated catalog data authenticated by the authentication granting unit to the database.

8. A method for building the information processing system according to claim 1, the method comprising:

a step of delivering, to the client node, a program for causing a computer to operate as the catalog preparation unit, the authentication request unit, and the use request unit;

a step of delivering, to the authentication node, a program for causing a computer to operate as the authentication granting unit; and a step of delivering, to the issuing node, a program for causing a computer to operate as the use request verification unit, and the use authorization unit.

9. A method for providing service data in an information processing system that includes a client node, an issuing node for issuing service data having terms of use, and an authentication node, where the issuing node provides the service data, the method comprising:

a catalog preparation step, in the client node, for preparing catalog data that anonymizes user data held by a user of the client node;

an authentication request step, in the client node, for requesting to the authentication node to grant authentication for validity of the catalog data;

an authentication granting step, in the authentication node, for granting authentication for validity of the catalog data upon the request in the authentication request step;

a use request step, in the client node, for requesting to use the service data by presenting authenticated catalog data authenticated by the authentication granting step;

a use request verification step, in the issuing node, for verifying whether information included in the user data as provided in the authenticated catalog data satisfies the terms of use upon the use request in the use request step; and a use authorization step, in the issuing node, for authorizing the client node to use the service data when the information satisfies the terms of use.

* * * * *